United States Patent
Wang et al.

(10) Patent No.: US 11,935,257 B2
(45) Date of Patent: Mar. 19, 2024

(54) ADDING AN ADAPTIVE OFFSET TERM USING CONVOLUTION TECHNIQUES TO A LOCAL ADAPTIVE BINARIZATION EXPRESSION

(71) Applicant: Ambarella International LP, Santa Clara, CA (US)

(72) Inventors: Liangliang Wang, Shanghai (CN); Wenhai Gao, Shanghai (CN); Bo Yu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 391 days.

(21) Appl. No.: 17/412,715

(22) Filed: Aug. 26, 2021

(65) Prior Publication Data
US 2023/0052553 A1 Feb. 16, 2023

(30) Foreign Application Priority Data
Aug. 16, 2021 (CN) .......................... 202110943775.2

(51) Int. Cl.
*G06T 7/521* (2017.01)
*G06F 18/22* (2023.01)
(Continued)

(52) U.S. Cl.
CPC ............. *G06T 7/521* (2017.01); *G06F 18/22* (2023.01); *G06T 7/0002* (2013.01); *G06T 7/194* (2017.01);
(Continued)

(58) Field of Classification Search
CPC ............ G06N 3/045; G06N 3/08; G06N 3/02; G06N 5/01; G06T 2207/20084;
(Continued)

(56) References Cited

U.S. PATENT DOCUMENTS

2017/0091281 A1\* 3/2017 Tizhoosh ................. G06N 3/08
2021/0390677 A1\* 12/2021 Do .......................... G06T 7/001

FOREIGN PATENT DOCUMENTS

CN          106841216 A  *  6/2017
CN          105261324 B  * 12/2017
(Continued)

OTHER PUBLICATIONS

Bhargava et al., "Generalized framework for summarization of fixed-camera lecture videos by detecting and binarizing handwritten content" (Year: 2019).*

(Continued)

*Primary Examiner* — Dung Hong
(74) *Attorney, Agent, or Firm* — Christopher P. Maiorana, PC

(57) ABSTRACT

An apparatus comprising an interface, a structured light projector and a processor. The interface may receive pixel data. The structured light projector may generate a structured light pattern. The processor may process the pixel data arranged as video frames, perform operations using a convolutional neural network to determine a binarization result and an offset value and generate disparity and depth maps in response to the video frames, the structured light pattern, the binarization result, the offset value and a removal of error points. The convolutional neural network may perform a partial block summation to generate a convolution result, compare the convolution result to a speckle value to determine the offset value, generate an adaptive result in response to performing a convolution operation, compare the video frames to the adaptive result to generate the binarization result for the video frames, and remove the error points from the binarization result.

20 Claims, 19 Drawing Sheets

FIG. 15

(51) Int. Cl.
*G06T 7/00* (2017.01)
*G06T 7/194* (2017.01)
*G06T 7/514* (2017.01)

(52) U.S. Cl.
CPC .... *G06T 7/514* (2017.01); *G06T 2207/10016* (2013.01); *G06T 2207/20012* (2013.01); *G06T 2207/20081* (2013.01); *G06T 2207/20084* (2013.01); *G06T 2207/30168* (2013.01)

(58) Field of Classification Search
CPC .......... G06T 2207/20081; G06T 7/521; G06T 7/514; G06T 7/194; G06T 7/0002; G06T 2207/10016; G06T 2207/20012; G06T 2207/30168; G06F 18/22
See application file for complete search history.

(56) References Cited

FOREIGN PATENT DOCUMENTS

| CN | 107992865 A | * | 5/2018 | ........... G06F 9/4881 |
|---|---|---|---|---|
| CN | 110135563 A | * | 8/2019 | ........... G06N 3/0454 |
| CN | 112001878 A | * | 11/2020 | |

OTHER PUBLICATIONS

Wang et al., "Depth estimation for speckle projection system using progressive reliable points growing matching") (Year: 2013).*

* cited by examiner

ADDING AN ADAPTIVE OFFSET TERM USING CONVOLUTION TECHNIQUES TO A LOCAL ADAPTIVE BINARIZATION EXPRESSION

FIELD OF THE INVENTION

The invention relates to computer vision generally and, more particularly, to a method and/or apparatus for implementing adding an adaptive offset term using convolution techniques to a local adaptive binarization expression.

BACKGROUND

There has been a rapid development in machine vision, optical technology, and artificial intelligence. Three-dimensional (3D) reconstruction has become an important branch of machine vision. Conventional 3D reconstruction technology has problems for real-time applications. The speed of 3D reconstruction is not fast enough and the accuracy of the 3D reconstruction is not accurate enough.

One method of 3D reconstruction is performed using a monocular speckle structured light system. Results of 3D reconstruction using the monocular speckle structured light are affected by various factors such as the power of the speckle projector, temporal noise, spatial noise, reflectivity of the detected object, etc. Due to the lack of speed and accuracy of the 3D reconstruction, applications are generally limited to scenarios that do not require high accuracy, such as three-dimensional face recognition and face live detection.

The performance of 3D reconstruction technology using a monocular speckle structured light system is limited mainly based on a matching speed and matching accuracy of the back-end calculation methods. The preprocessing of a single-channel image obtained by the front-end speckle structured light is not perfect for the research on the accuracy and speed of the back-end calculations. Conventional back-end calculations for performing binarization operations are primarily based on simple global binarization, local binarization, local adaptive binarization, etc. Additional methods are then used to perform a local or global binarization summation.

It would be desirable to implement adding an adaptive offset term using convolution techniques to a local adaptive binarization expression.

SUMMARY

The invention concerns an apparatus comprising an interface, a structured light projector and a processor. The interface may receive pixel data. The structured light projector may generate a structured light pattern. The processor may process the pixel data arranged as video frames, perform operations using a convolutional neural network to determine a binarization result and an offset value and generate a disparity map and a depth map in response to the video frames, the structured light pattern, the binarization result, the offset value and a removal of error points. The convolutional neural network may perform a partial block summation and an average on the video frames to generate a convolution result, compare the convolution result to an ideal speckle value to determine the offset value, generate an adaptive result in response to performing a convolution operation to add the offset value to the video frames, compare the video frames to the adaptive result to generate the binarization result for the video frames, and remove the error points from the binarization result.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
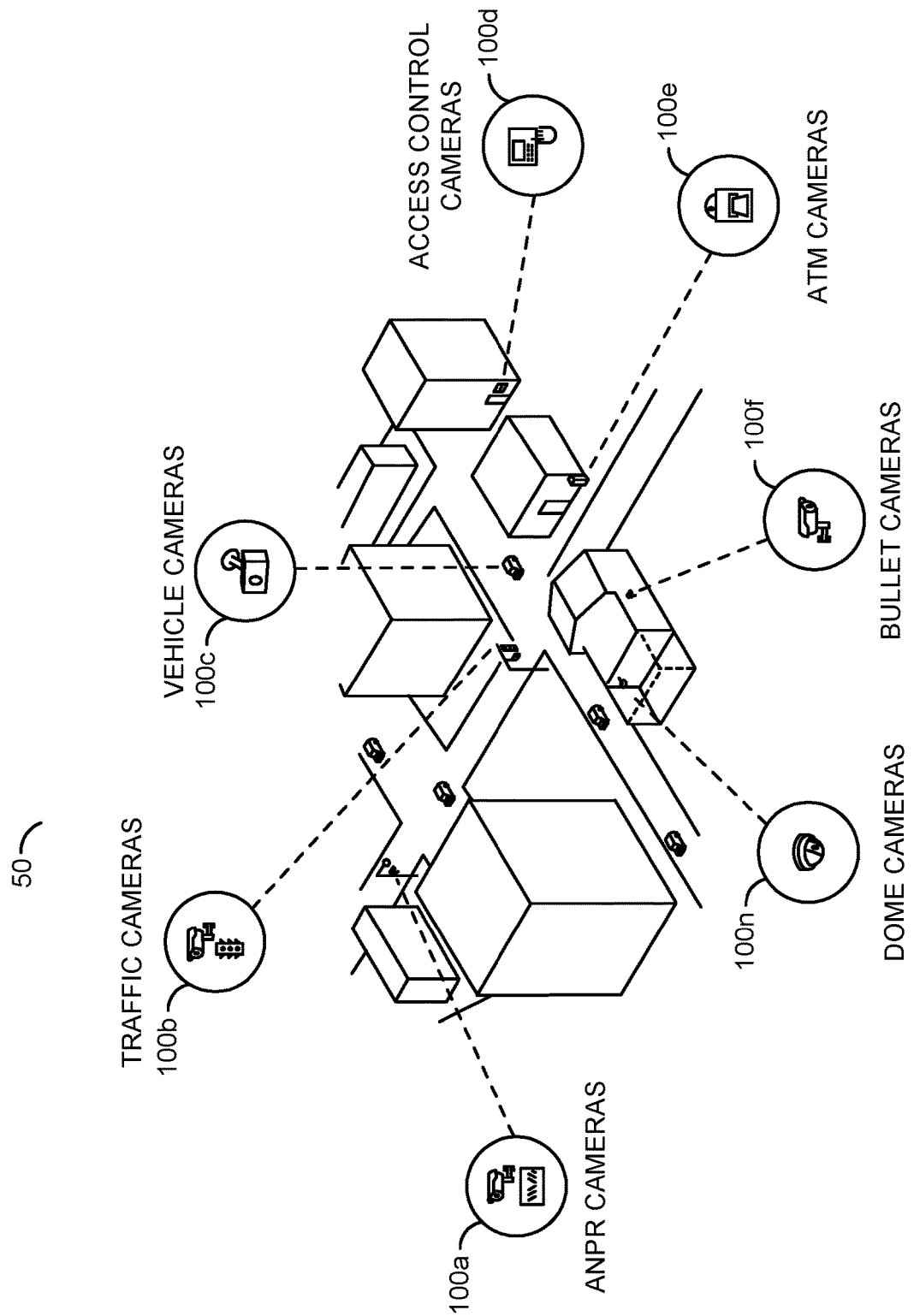
FIG. 1 is a diagram illustrating examples of edge devices that may utilize a processor configured to implement a convolutional neural network in accordance with example embodiments of the invention.

Embodiments of the present invention include providing adding an adaptive offset term using convolution techniques to a local adaptive binarization expression that may (i) be performed by a processor on an edge device, (ii) utilize convolutional neural networks implemented on a processor, (iii) reduce the generation of error points, (iv) separate the speckle pattern from the background image, (v) perform area summation and add offset operations using convolution operations to accelerate performance, (vi) eliminate error points after binarization, (vii) reduce a probability of error matching, (viii) reduce a proportion error disparity for pixels by adding the adaptive bias, (ix) improve Z-accuracy, (x) replace averaging operations with a convolution and/or (xi) be implemented as one or more integrated circuits.

Embodiments of the present invention may be implemented using a video processor. The video processor may comprise hardware dedicated to implementing convolutional neural networks. The dedicated hardware for implementing the convolutional neural networks may be configured to provide acceleration processing for convolution operations. The hardware accelerated processing provided by the dedicated hardware for implementing the convolutional neural networks may enable edge devices to calculate a local binarization expression using convolution techniques to add an adaptive offset term. Without the hardware accelerated processing, the convolution techniques may be impractical to implement (e.g., performance may be too slow for real-time applications).

The dedicated hardware for implementing convolutional neural networks may be configured to accelerate preprocessing of speckle structured light for monocular 3D reconstruction. Embodiments of the present invention may be configured to generate a local adaptive binary expression with an adaptive offset term. The dedicated hardware for implementing convolutional neural networks may be configured to generate the local adaptive binary expression with the adaptive offset term. Generating the local adaptive binary expression with an adaptive offset term may reduce the number of calculations performed and/or improve the accuracy of the back-end matching performed compared to conventional methods for monocular structured light matching preprocessing.

The preprocessing method implemented for the monocular structured light matching techniques may be used for summation. The adaptive offset term may be added in order to provide accuracy and/or richness to the feature expression of the binary image after binarization is performed. A local summation may be performed using an ordinary convolution method implemented in the dedicated hardware for convolutional neural networks. The offset term may be added to boost a speed of the process of summing and a subsequent addition of the offset term. The preprocessing using the convolution may be performed to provide beneficial (e.g., optimal) conditions for generating the local adaptive binarization expression based on adding the adaptive offset term.

Determining the adaptive offset term may enable separation of the speckle pattern from a background image. The adaptive offset term may limit the generation of error points in a quadruple field. The remaining error points after binarization may be eliminated by implementing a quadruple domain method. The quadruple domain method may be implemented in order to reduce a probability of error matching in a later stage.

Using the convolution operations to perform binarization operations may accelerate the performance (e.g., reduce processing time) for the calculations. Full use of the convolution operations may be used to perform area summation and/or add offset operations.

Referring to FIG. 1, a diagram illustrating examples of edge devices that may utilize a convolutional neural network in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
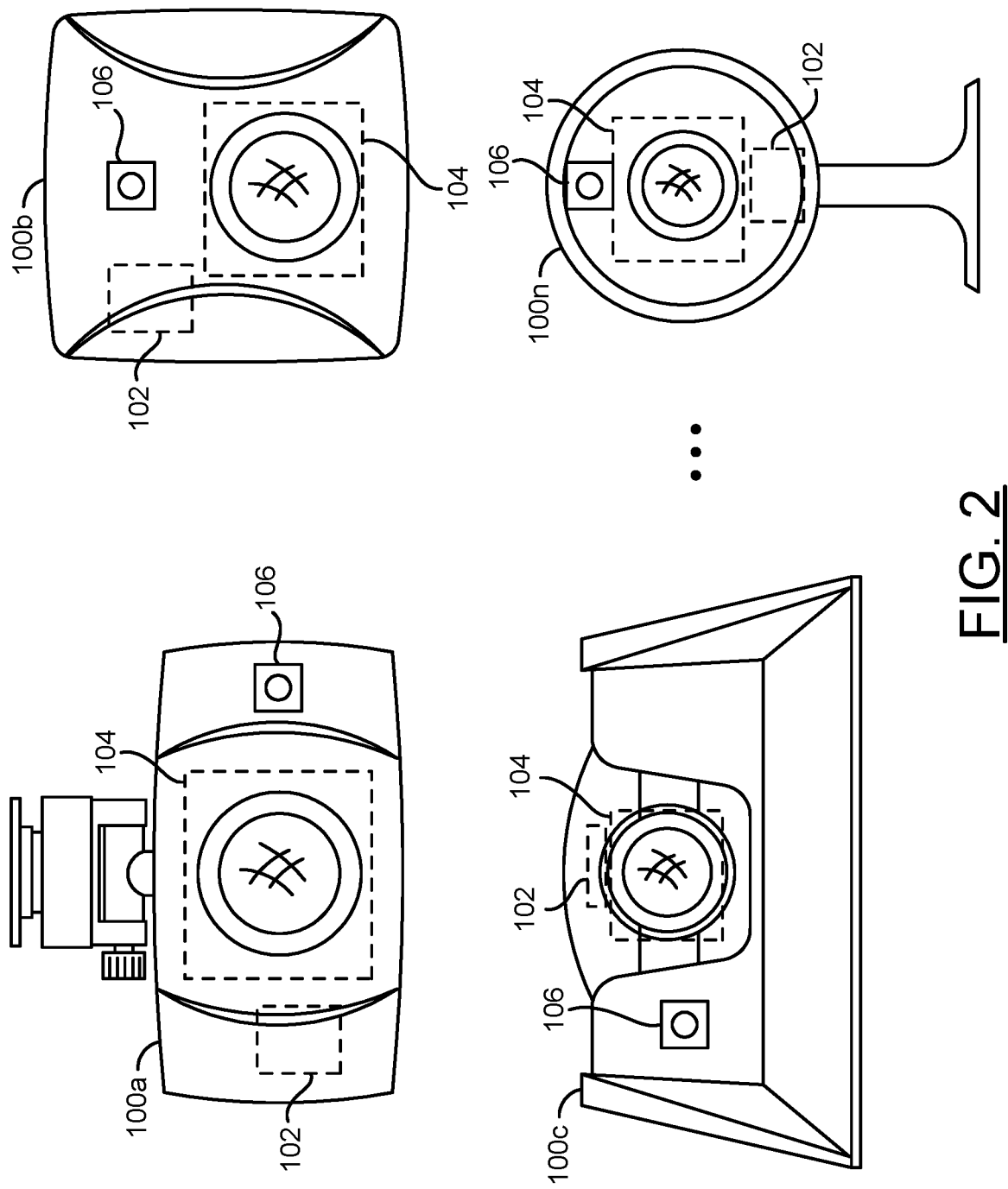
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor.

The circuit 104 may implement a capture device. The circuit 106 may implement a structured light projector. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
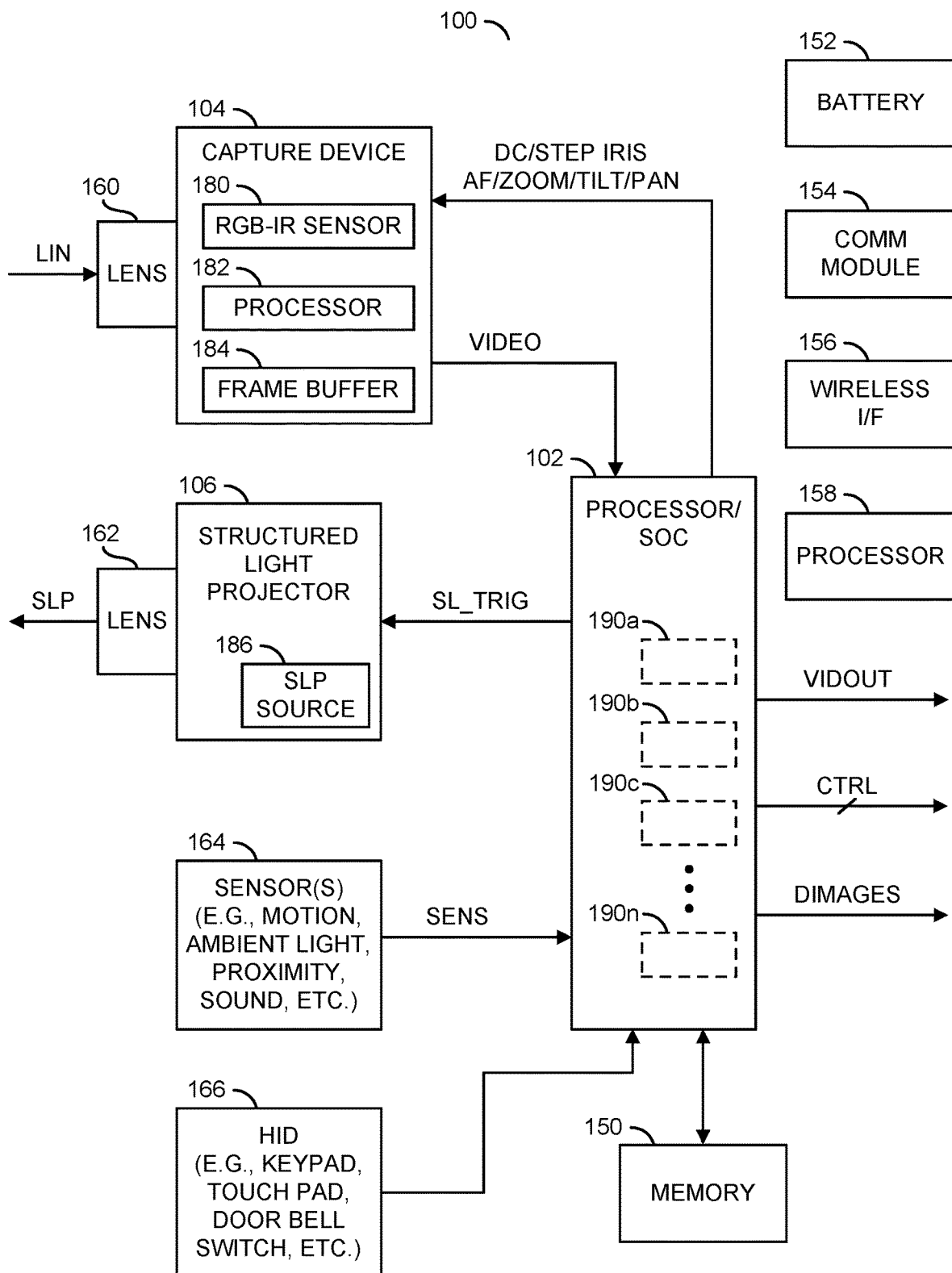
FIG. 3 is a diagram illustrating a block diagram of a camera system.

Referring to FIG. 3, a block diagram of the camera system 100 is shown illustrating an example implementation. In an example, the camera system 100 may comprise the processor/SoC 102, the capture device 104, and the structured light projector 106 as shown in association with FIG. 2. The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100*a*-100*n*, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The processor 102 may be configured to generate the signal CTRL in response to sensor fusion operations (e.g., aggregating information received from disparate sources). The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
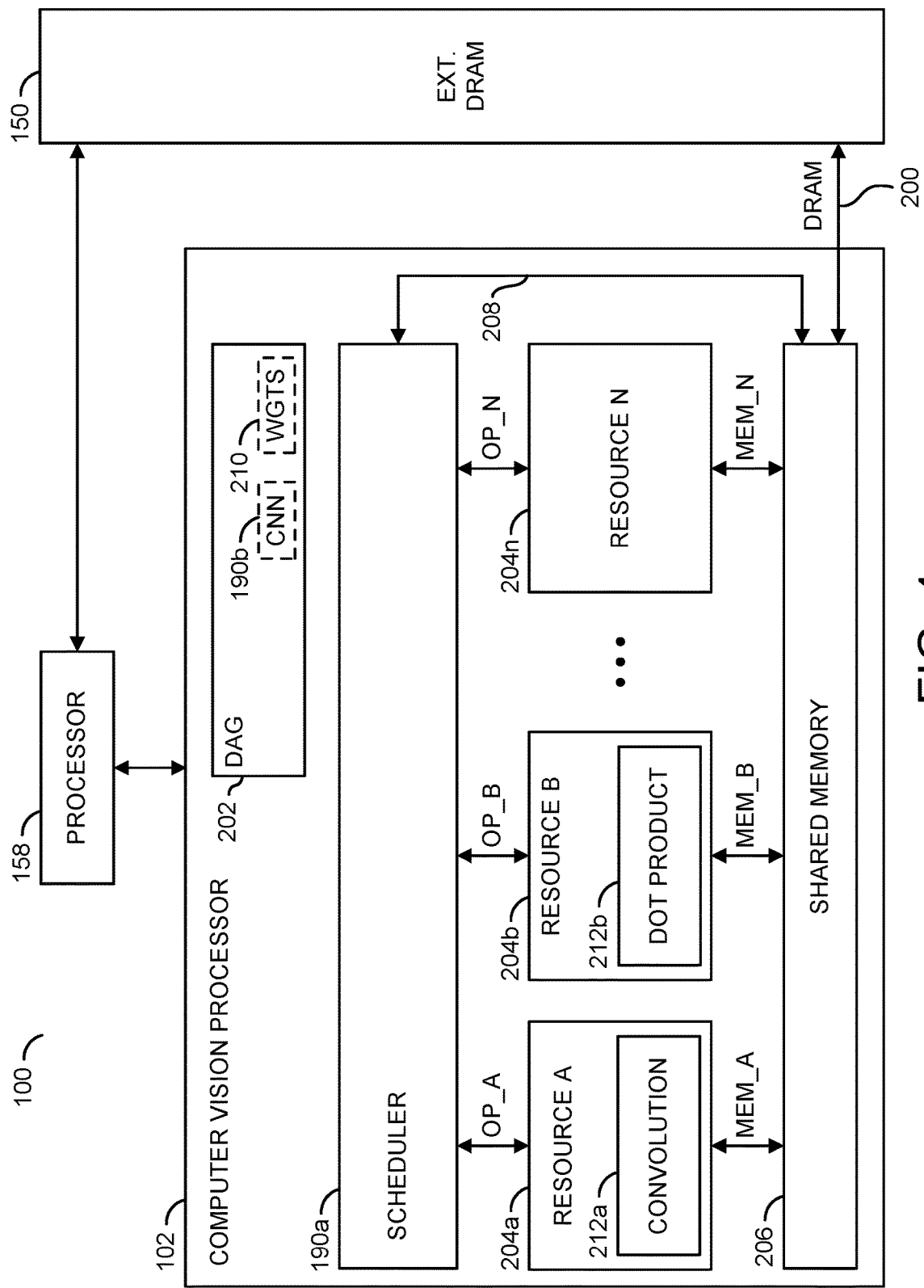
FIG. 4 is a diagram illustrating processing circuitry of a camera system implementing a convolutional neural network configured to perform 3D reconstruction.

Referring to FIG. 4, a diagram illustrating processing circuitry of a camera system implementing a convolutional neural network configured to perform 3D reconstruction is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP N) may be exchanged between the circuit 190a and the respective circuits 204a-204n. Each of the signals OP_A-OP N may convey execution operation information and/or yield operation information. Multiple signals (e.g., MEM_A-MEM N) may be exchanged between the respective circuits 204a-204n and the circuit 206. The signals MEM_A-MEM N may carry data. A signal (e.g., DRAM) may be exchanged between the circuit 150 and the circuit 206. The signal DRAM may transfer data between the circuits 150 and 190a (e.g., on the transfer path 208).

The circuit 190a may implement a scheduler circuit. The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
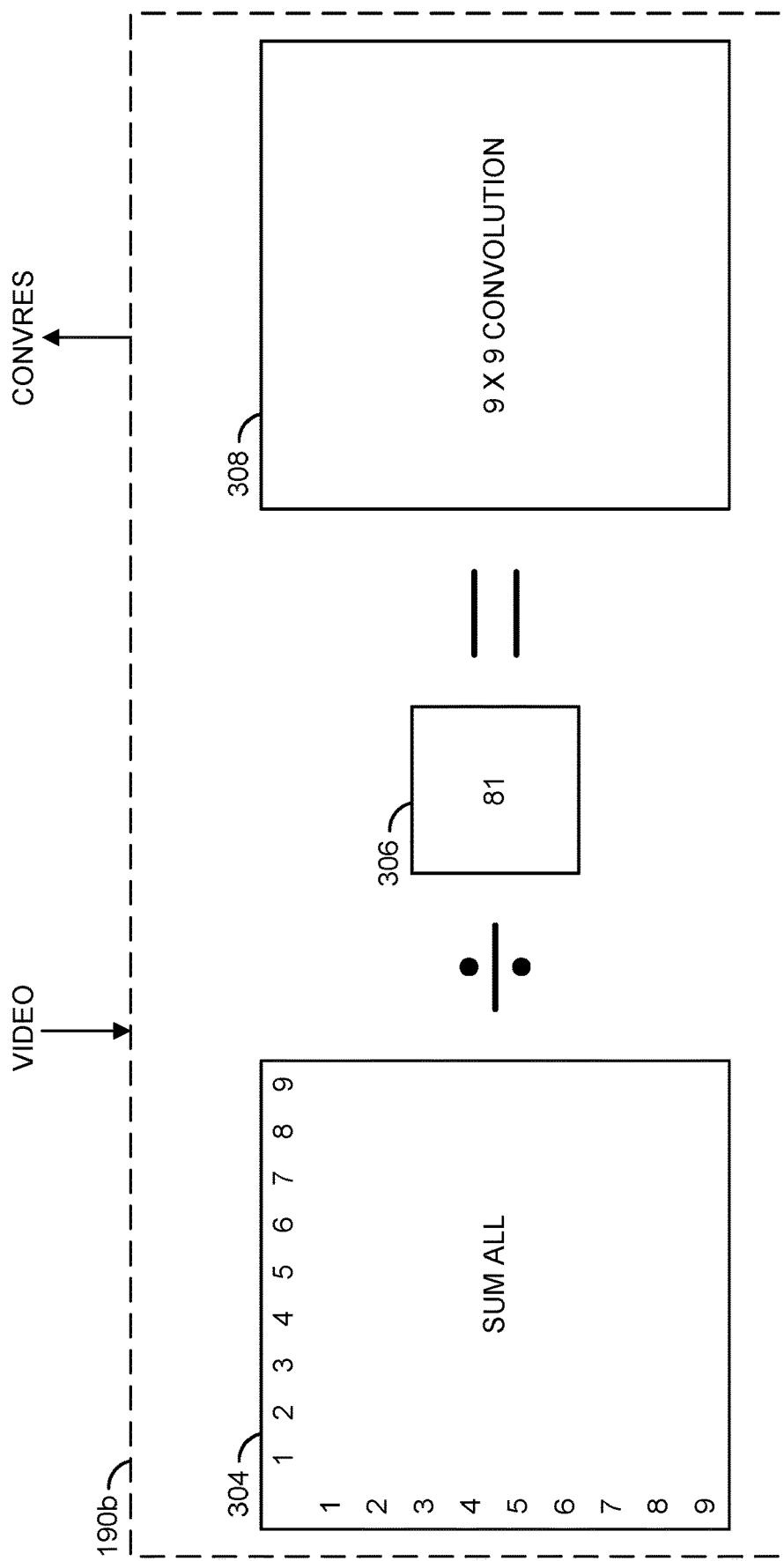
FIG. 5 is a diagram illustrating preprocessing of video frames using a partial block summation performed by a neural network implemented by the processor.

Referring to FIG. 5, a diagram illustrating preprocessing of video frames using a partial block summation performed by a neural network implemented by the processor is shown. A visualization 300 is shown. The visualization 300 may represent an example of an operation performed using the neural network implemented by the processor 102. The visualization 300 may illustrate a partial block summation and average operation performed using convolution techniques implemented locally by the edge device 100 to generate a convolution result.

The operations shown in the visualization 300 of the partial block summation (e.g., area summation) and averaging operation may be performed utilizing the CNN module 190b. The visualization 300 may represent a number of operations for performing preprocessing of the video frames and/or references frames. In one example, the partial block summation and averaging operation may be implemented by one or more of the hardware engines 204a-204n. The partial block summation and averaging operation may be implemented using additional components (not shown).

The CNN module 190b may receive the signal VIDEO. The signal VIDEO may comprise the single channel images (e.g., new incoming video frames captured by the camera system 100) with the structured light pattern. In one example, the signal VIDEO may comprise reference images (e.g., perform preprocessing offline). The reference images may be used as a baseline for depth data that may have been calculated using the camera system 100 under known conditions. For example, the operations performed in the visualization 300 may be implemented online (e.g., preprocessing performed for source images captured in real time) or implemented offline (e.g., preprocessing performed for reference images). The preprocessing operations shown in the visualization 300 may provide some of the operations for generating data for other (e.g., upcoming) operations performed by the processor 102 (e.g., generating the depth maps and/or disparity maps).

The CNN module 190b is shown illustrating a block 304, a block 306 and/or a block 308. The blocks 304-308 may illustrate various inputs, operations and/or outputs performed by the CNN module 190b to perform the partial block summation and/or the averaging operation. In one example, the blocks 304-308 may represent calculations performed by the hardware engines 204a-204n. For example, the hardware engines 204a-204n may be specifically tuned to perform the various calculations described by and/or associated with the blocks 304-308. The block 304 may represent a partial block summation for the input video images (e.g., the input images VIDEO, which may comprise source video frames or reference images). The block 306 may represent an averaging block. The block 308 may represent a convolution result.

The processor 102 may be configured to utilize the processing capability of the CNN module 190b to accelerate the calculations performed for the partial block summation and/or to generate the convolution result. In an example, the partial block summation of input 304 may comprise a block size of 9×9. The CNN module 190b may perform the partial block summation with the block size of 9×9 on the collected original single-channel images (e.g., the source images or the reference images). The CNN module 190b may then divide the partial block summation 304 by the averaging block 306. The averaging block 306 may have a block size of 9×9 and all the values may be eighty-one. The result of dividing the partial block summation 304 by the averaging value 306 may provide an average value of the block image. The CNN module 190b may use a 9×9 ordinary convolution using the hardware resources 204a-204n to accelerate the calculations instead of performing an averaging operation after the summation. The weight of the convolution may be 9×9 and the values inside may each be eighty-one values for the convolution operation. The step size of the convolution may be 1 (e.g., the convolution kernel data is 1/81 to get convolution result 308).

The result of dividing the partial block summation 304 by the averaging block 306 may be the convolution result 308. The convolution result 308 may be a 9×9 value. The CNN module 190b may generate an output signal (e.g., CONVRES). The signal CONVRES may comprise the convolution result 308. While the visualization 300 is shown with the signal CONVRES as an output, the convolution result 308 may be used internally by the CNN module 190b. The convolution result 308 may be generated in response to the hardware of the CNN module 190b that may perform a partial block summation and an average on the video frames.

Figure 6:
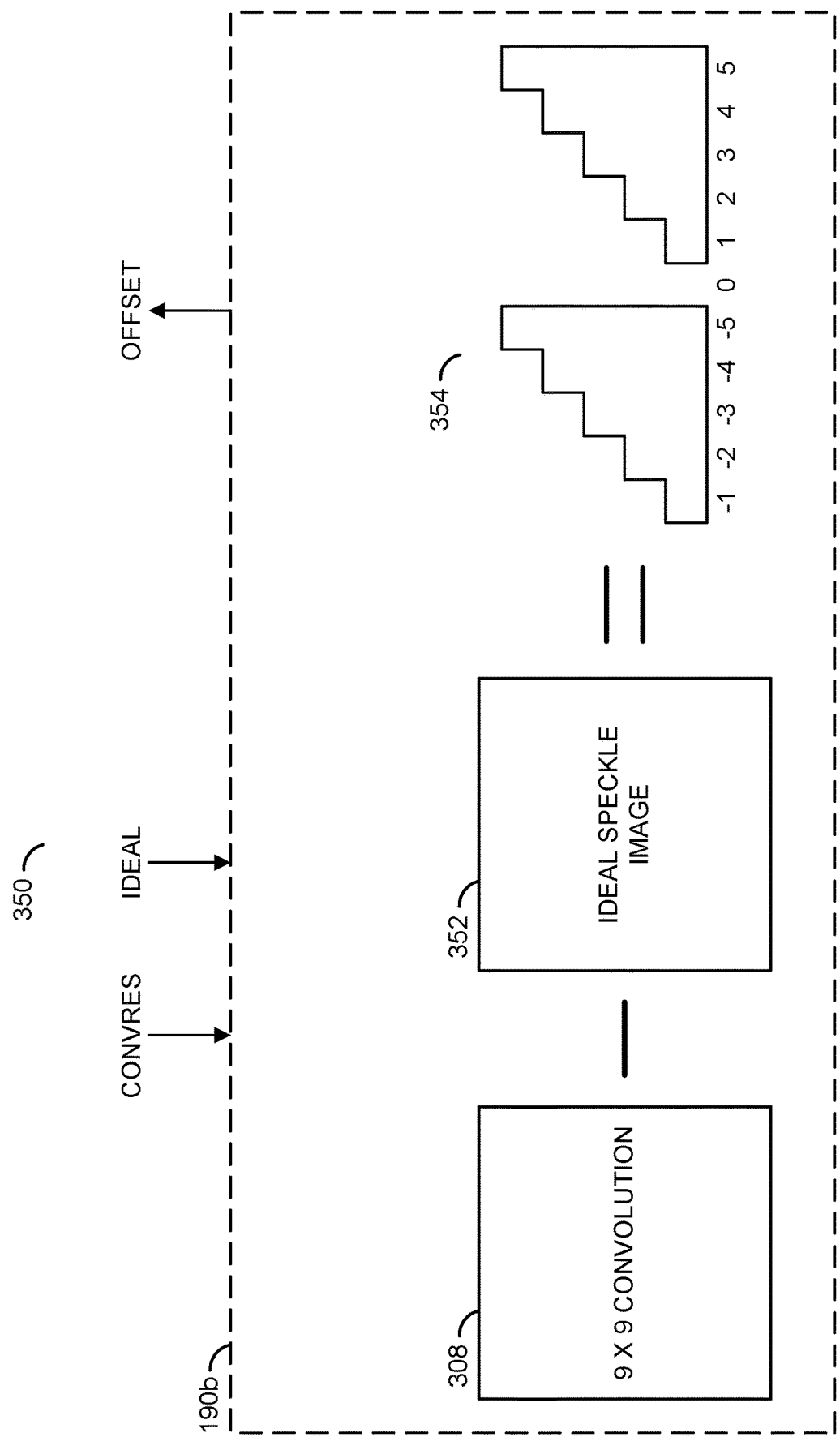
FIG. 6 is a diagram illustrating determining an offset value performed by a neural network implemented by the processor.

Referring to FIG. 6, a diagram illustrating determining an offset value performed by a neural network implemented by the processor is shown. A visualization 350 is shown. The visualization 350 may represent an example of an operation performed using the neural network implemented by the processor 102. The visualization 350 may illustrate generating an offset value.

The operations shown in the visualization 350 for generating the offset value may be performed utilizing the CNN module 190b. The visualization 350 may represent a number of operations for performing preprocessing of the video frames and/or references frames. The preprocessing operations shown in the visualization 350 may provide some of the operations for generating data for other (e.g., upcoming) operations performed by the processor 102 (e.g., generating the depth maps and/or disparity maps). The offset value may be determined using additional components (not shown). The CNN module 190b may receive the signal CONVRES and a signal (e.g., IDEAL). The signal IDEAL may comprise ideal speckle images. The visualization 350 may represent a neural network operation performed by the processor 102 after the convolution result 308 has been generated as shown in association with FIG. 5.

The CNN module 190b is shown illustrating the convolution result 308, a block 352 and/or a block 354. The block 308 and/or the blocks 352-354 may illustrate various inputs, operations and/or outputs performed by the CNN module 190b to generate the offset value. In one example, the block 308 and/or the blocks 352-354 may represent calculations performed by the hardware engines 204a-204n. For example, the hardware engines 204a-204n may be specifically tuned to perform the various calculations described by and/or associated with the block 308 and/or the blocks 352-354. The block 352 may represent the ideal (e.g., reference) speckle images (e.g., the signal IDEAL). The block 354 may represent the adaptive offset value.

After obtaining the convolution result 308, the CNN module 190b may be configured to compare each result (after convolution) with the ideal speckle value 352. The ideal speckle value may be determined based on a maximum ideal projection distance of the structured light projector 106. In an example, a size of the ideal speckle value may be obtained by projecting the structured light pattern SLP against a white wall at a maximum ideal distance (e.g., a farthest distance that the structured light SLP may be visible when generated by the structured light projector 106 and/or an ideal parameter of the structured light source 186). The signal IDEAL may comprise the video frames generated using the ideal speckle value. The signal IDEAL may be used as reference images comprising the ideal speckle value that may be compared to the single-channel source video frames or the reference video frames (e.g., the signal VIDEO).

The CNN module 190b may be configured to calculate a difference between each corresponding value of the entire speckle (e.g., the speckle pattern captured in the convolution result 308 generated from the signal VIDEO) and the ideal speckle pattern images 352. The CNN module 190b may build a histogram to calculate the difference result. The difference of the most counted points in the histogram may be used as the offset value 354.

The offset value 354 may be an output of the CNN module 190b. The CNN module 190b may be configured to generate an output signal (e.g., OFFSET). The signal OFFSET may comprise the offset value 354. While the visualization 350 is shown with the signal OFFSET as an output, the offset value 354 may be used internally by the CNN module 190*b*. The offset value 354 may be generated by the CNN module 190*b* comparing the convolution result 308 to the ideal speckle value 352.

The operations illustrated by the visualization 300 shown in association with FIG. 5 and the visualization 350 shown in association with FIG. 6 may comprise calculations performed utilizing the hardware accelerated engines 204*a*-204*n* to determine the offset value 354 from the source images and the reference images. The source images and the real reference images may both be used in the visualization 350 to determine the offset value. Both the source images and the real reference images may be used to determine the convolution result 308 to compare with the reference images 352 that have the ideal speckle value (e.g., the signal IDEAL). The source images may be compared to the ideal speckle value at a different time than the comparison of the real reference images to the reference images that have the ideal speckle value.

In one example, the operations illustrated by the visualization 300 and the visualization 350 may be performed outside the system (e.g., offline). In another example, the operations illustrated by the visualization 300 and the visualization 350 may be performed while the system is online and/or real-time in the system. For example, the source images may be preprocessed to determine the offset value 354 in real-time while the system is online (e.g., real-time operation of the camera system 100). In another example, the reference images may be preprocessed to determine the offset value 354 while the system is offline (e.g., during offline training). Whether the operations are performed online or offline may depend on whether the scene used is determined (e.g., the characteristics and/or distances to various objects are known in advanced to be used as real references). Once the system and the scene are determined, the adaptive offset phase 354 may also be determined. Then the CNN module 190*b* may directly use the 9×9 convolution kernel for additional operations (to be described in association with FIG. 7).

Figure 7:
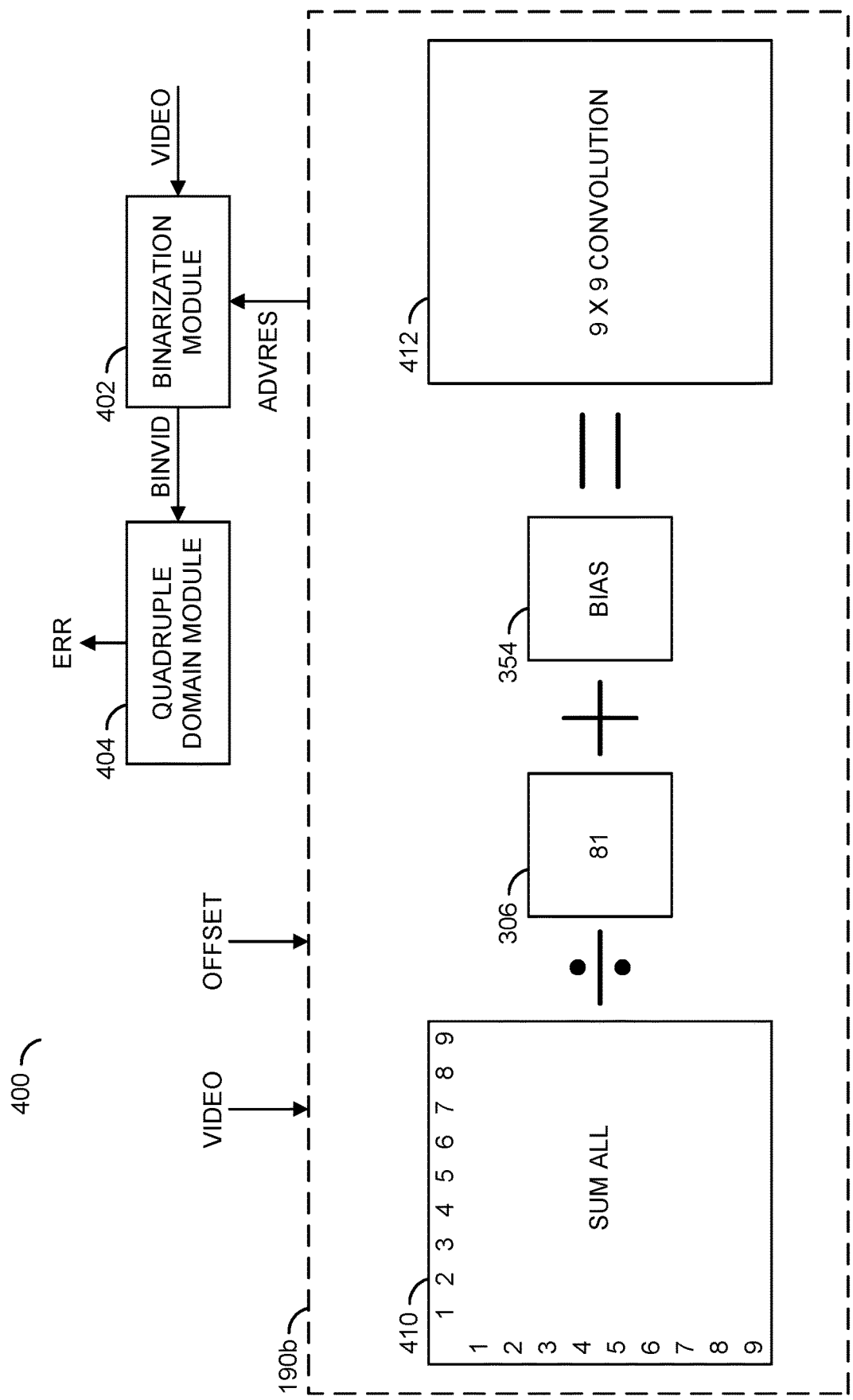
FIG. 7 is a diagram illustrating determining an adaptive offset result by combining the video frames with the offset value performed by a neural network implemented by the processor.

Referring to FIG. 7, a diagram illustrating determining an adaptive offset result by combining the video frames with the offset value performed by a neural network implemented by the processor is shown. A visualization 400 is shown. The visualization 400 may represent an example of an operation performed using the neural network implemented by the processor 102. The visualization 400 may illustrate generating an adaptive result. The visualization 400 may represent a number of operations for performing preprocessing of the video frames and/or references frames. The preprocessing operations shown in the visualization 400 may provide some of the operations for generating data for other (e.g., upcoming) operations performed by the processor 102 (e.g., generating the depth maps and/or disparity maps).

The operations shown in the visualization 400 for generating the adaptive result may be performed utilizing the CNN module 190*b*, a block (or circuit) 402 and/or a block (or circuit) 404. The block 402 may implement a binarization module. The block 404 may implement a quadruple domain module. In one example, the binarization module 402 and/or the quadruple domain module 404 may be implemented by one or more of the hardware engines 204*a*-204*n*. In another example, the binarization module 402 and/or the quadruple domain module 404 may be implemented as part of the video processing pipeline of the processor 102. The adaptive result may be determined using additional components (not shown). The CNN module 190*b* may receive the signal VIDEO and the signal OFFSET. For example, the visualization 400 may represent a neural network operation performed by the processor 102 after the offset value 354 has been generated as shown in association with FIG. 6.

In some embodiments, the operations performed in the visualization 400 (e.g., adding the offset value 354) may be performed on the source images. In some embodiments, the operations performed in the visualization 400 may be performed on the real reference images. In some embodiments, the adaptive offset value 354 may not be added to the real reference images. For example, the real reference images may have been prepared offline to determine the binarization result for the real reference images.

The CNN module 190*b* is shown illustrating the averaging value 306, the offset value (or bias) 354, a block 410, and/or a block 412. The block 306, the block 354 and/or the blocks 410-412 may illustrate various inputs, operations and/or outputs performed by the CNN module 190*b* to generate the adaptive result. In one example, the block 306, the block 354 and/or the blocks 410-412 may represent calculations performed by the hardware engines 204*a*-204*n*. For example, the hardware engines 204*a*-204*n* may be specifically tuned to perform the various calculations described by and/or associated with the block 306, the block 354 and/or the blocks 410-412. The block 410 may represent the source images (e.g., the signal VIDEO). In an example, the block 410 may comprise a block summation (e.g., an area summation) of the source video data or the reference video data (e.g., a block size of 9×9). The block 412 may represent an adaptive result. After obtaining the offset value 354, the CNN module 190*b* may be configured to determine the adaptive result 412. The CNN module 190*b* may implement the 9×9 convolution kernel to determine the adaptive result 412. The weight of the convolution may be 9×9 and the values inside may all be eighty-one. The convolution operation may be directly performed to obtain the adaptive result 412.

The convolution operations performed by the hardware engines 204*a*-204*n* may be configured to add the adaptive offset value 354 to the source images 410 (or real reference images) after determining the adaptive offset 354 (e.g., as shown in the visualization 350 shown in association with FIG. 6). An average result of the of the source images 410 may be determined in response to dividing the source images 410 by the averaging value 306 (e.g., a block size of 9×9 and all the values may be eighty-one). The offset value 354 may be added to the average result. The offset value 354 may be added using hardware accelerated convolution operations. An adaptive offset phase may be included in the offset value 354. In an example, the adaptive result 412 may comprise the single channel images 9×9 block average value plus the offset value 354.

The adaptive result 412 may be an output of the CNN module 190*b*. The CNN module 190*b* may be configured to generate an output signal (e.g., ADVRES). The signal ADVRES may comprise the adaptive result 412. While the visualization 400 is shown with the signal ADVRES as an output, the adaptive result 412 may be used internally by the CNN module 190*b*. The CNN module 190*b* may be configured to generate the adaptive result 412 in response to performing a convolution operation to add the offset value 354 to the video frames (e.g., the summation of the video frames 410).

The signal ADVRES may be presented to the binarization module 402. The binarization module 402 may be configured to receive the signal ADVRES and the single channel input images in the signal VIDEO. The binarization module 402 may be configured to perform a comparison of the adaptive result 412 in the signal ADVRES and the single channel input images in the signal VIDEO. In some embodiments, the binarization module 402 may be configured to perform a comparison of the adaptive result 412 generated from the real reference images and the real reference images.

The comparison between the adaptive result 412 and the source images in the signal VIDEO performed by the binarization module 402 may be performed to determine a binarization expression for the source images. Similarly, the comparison between the adaptive result 412 of the real reference images and the real reference images in the signal VIDEO performed by the binarization module 402 may be performed to determine a binarization expression for the real reference images. The comparison may be performed by an analysis of corresponding points from the adaptive result 412 and the video data. In an example, if a result of a comparison is greater than or equal to 1, then the output for the binarization expression may be 0 and if the result of the comparison is less than 1, then the output for the binarization expression may be 1. The analysis of the comparison may form the result after binarization.

In the example shown, the binarization module 402 may generate the binarization result for the input images. Similar operations may be performed by the binarization module 402 to perform binarization on the real reference images (e.g., to form the result of the binarization of the reference images). Generally, the real reference images may have been prepared offline to enable generation of a binarization expression for the real reference images. The adaptive offset value 354 may be determined online or offline. Using the adaptive offset value 354, the adaptive result 412 may be determined. Then, using the adaptive result 412, a binarization expression may be determined for the source images in the signal VIDEO.

The binarization module 402 may generate a signal (e.g., BINVID). The signal BINVID may comprise the binarization expression for the source images or the binarization result for the real reference images. The signal BINVID may be presented to the quadruple domain module 404.

The quadruple domain module 404 may be configured to remove error points from the binarization result of the source images BINVID (or the binarization result for the real reference images). The quadruple domain module 404 may be configured to implement a quadruple domain method (to be described in association with FIG. 8). While the quadruple domain method is shown, in some embodiments, the quadruple domain module 404 may be configured to perform point separation using a four-connected component labeling operation. The quadruple domain module 404 may generate a signal (e.g., ERR). The signal ERR may comprise the binarization result of the source image with the error points removed. Similarly, the signal ERR may comprise the binarization result for the real reference image with the error points removed.

Removing the error points may comprise fitting the error points to zero value but not the one value. After the signal ERR is generated, then the preprocessing performed by the CNN module 190b may be finished (e.g., binary data for the source images and binary data for the real reference images may have been determined). The processor 102 may be configured to utilize the binary data for the source images and the binary data for the real reference images for later operations. In one example, the binary data for the source images and the binary data for the real reference images (e.g., the signal ERR) may be used as input for a matching operation. The matching operation may be used to generate depth maps and disparity maps. Details of the depth maps and the disparity maps generated in response to the binary data determined by the preprocessing performed by the CNN module 190b may be described in association with FIGS. 9-14.

Figure 8:
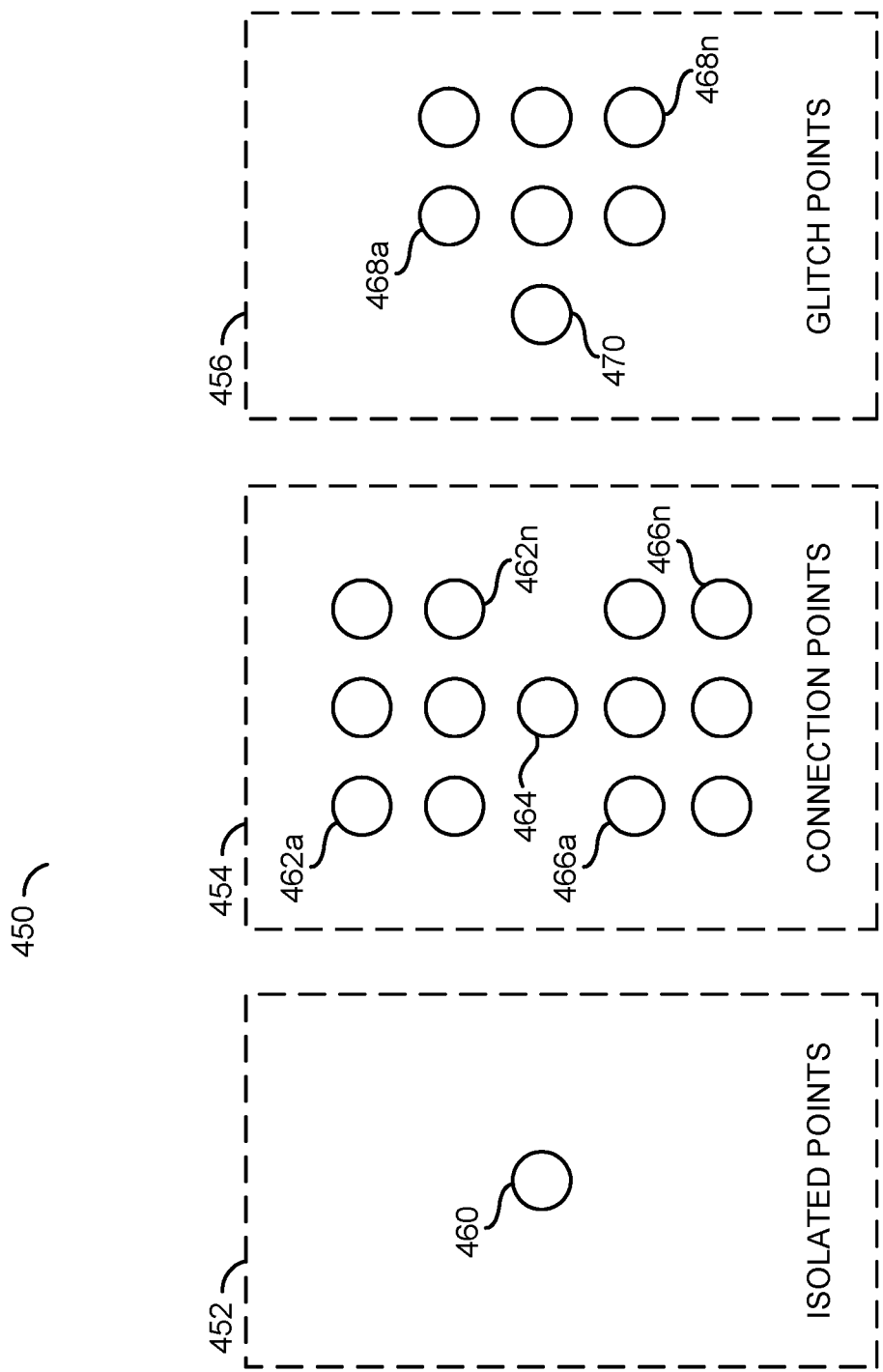
FIG. 8 is a diagram illustrating error points removed using a quadruple domain method performed by a neural network implemented by the processor.

Referring to FIG. 8, a diagram illustrating error points removed using a quadruple domain method performed by a neural network is shown. A visualization of error points 450 are shown. The visualization of error points 450 may represent the types of error points removed using the quadruple domain method performed by the quadruple domain module 404 shown in association with FIG. 7.

After obtaining the result of binarization (e.g., either for the source images or the real reference images), the quadruple domain module 404 may receive the signal BINVID. The signal BINVID may comprise the binarization expression of the source images or the real reference images that may comprise a result equal in size to the original images (e.g., the signal VIDEO). The quadruple domain module 404 may be configured to remove various error points. In one example, the error points may comprise isolated points. In another example, the error points may comprise connection points. In yet another example, the error points may comprise glitch points. The types of error points removed may be varied according to the design criteria of a particular implementation.

The visualization 450 may comprise example error points 452-456. The error points 452-456 may affect a final accuracy of the depth images. The error points 452-456 may be eliminated by the quadruple domain method. The error points 452 may represent isolated points. The error points 454 may represent connection points. The error points 456 may represent glitch points.

The isolated points 452 may comprise a point 460. The point 460 may not be located near other points. The amount of space between the point 460 and other points in order to be considered an isolated point may be varied according to the design criteria of a particular implementation. The isolated point 460 may be an error that may be removed. In an example, the isolated point 460 may be assigned a value of zero in response to being detected by the quadruple domain method.

The connection points 454 may comprise a group of points 462a-462n, a connection point 464 and a group of points 466a-466n. The connection point 464 may be connected to both the group of points 462a-462n and the group of points 466a-466n. However, the connection point 464 may not be part of a group of points. The connection point 464 may be an error that may be removed. In an example, the connection point 464 may be assigned a value of two in response to being detected by the quadruple domain method.

The glitch points 456 may comprise a group of points 468a-468n and a glitch point 470. The glitch point 470 may be adjacent to one point in the group of points 468a-468n, but not part of a group of points. The glitch point 470 may be an error that may be removed. In an example, the glitch point 470 may be assigned a value of one in response to being detected by the quadruple domain method.

The signal ERR may comprise the binary data for the source images or the real reference images with the error points removed (e.g., a preprocessing result). The CNN module 190b may generate the preprocessing result. The preprocessing result may be used for upcoming operations performed by the processor 102 and/or the CNN module 190. In one example, the processor 102 may perform logical operations on the preprocessing result. For example, the processor 102 may perform an XOR operation between the binary data for the source images and the binary data for the reference images. The preprocessing result may be used as input in order to generate the disparity maps and/or the depth maps for 3D reconstruction.

Figure 9:
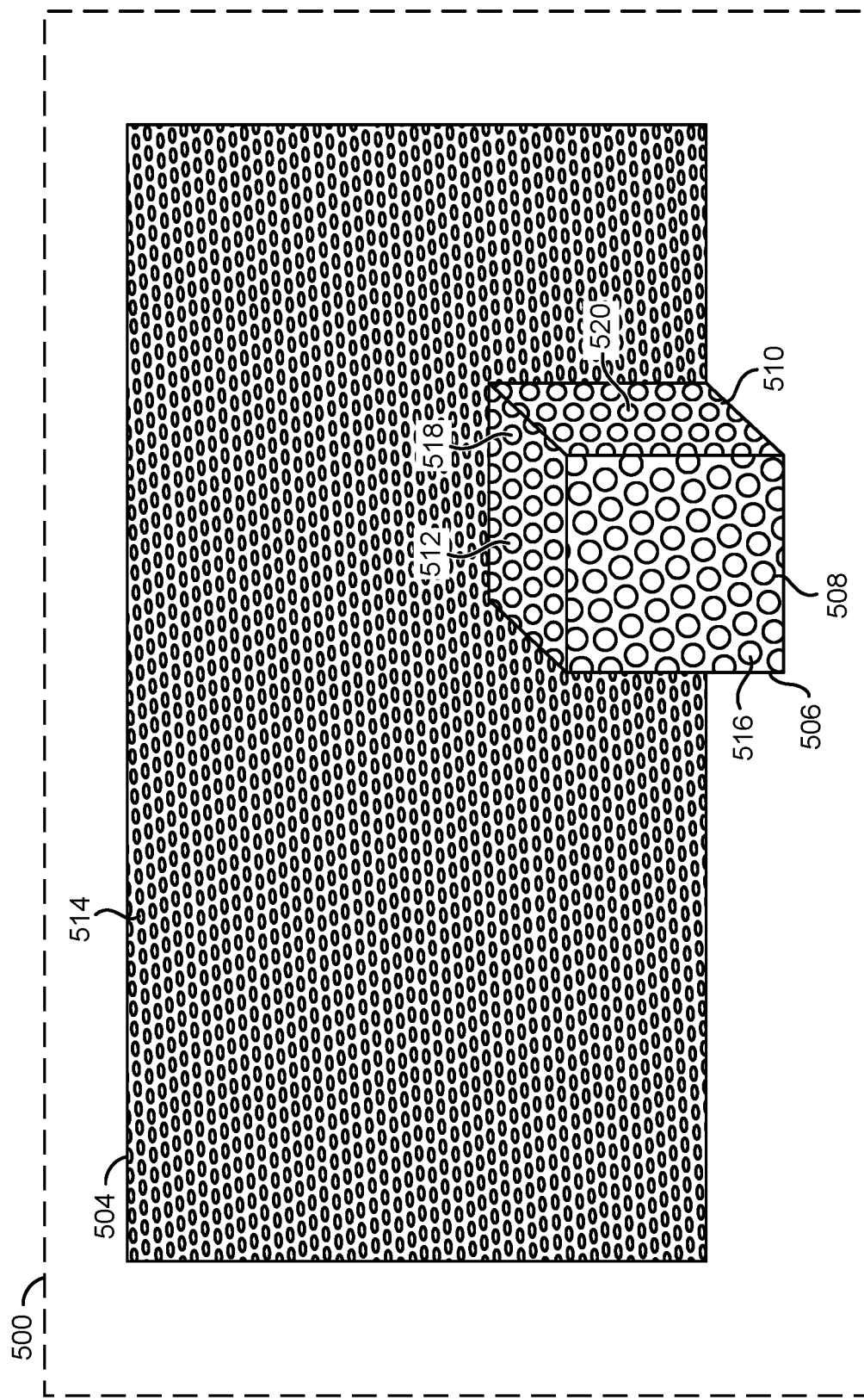
FIG. 9 is a diagram illustrating an example speckle image.

Referring to FIG. 9, a diagram illustrating an example speckle image is shown. A dotted box 500 is shown. The dotted box 500 may represent a video frame. The video frame 500 may be an example input video frame captured by the capture device 104. In an example, the video frame 500 may represent the signal VIDEO generated by the capture device 104 and presented to the processor 102. The video frame 500 may represent an example of a speckle image. The video frame 500 may capture the structured light pattern SLP generated by the structured light projector 106.

The video frame 500 may comprise a wall 504 and a box 506. The box 506 may have a front face 508, a side 510 and a top 512. The front face 508 of the box 506 may be generally facing a direction of the capture device 104 that captured the video frame 500. For example, the front face 508 may be a side of the box 506 with the closest distance to the capture device 104. In the example shown, the box 506 may not be directly facing the capture device 104. For example, the side 510 and the top 512 may be a distance that is farther away from the capture device 104 compared to the distance of the front face 508 to the capture device 104. The white wall 504 may be located farther away from the capture device 104 than the front face 508, the side 510 and/or the top 512 of the box 506.

Generally, in order to evaluate an accuracy of a depth-sensing system, a white wall may be used as an evaluation scene. The wall 504 may be the white wall for the evaluation scene. The box 506 may be located in front of the white wall 504. An accuracy of the depth and/or disparity of the white wall 504 and the box 506 may be determined. In an example, a depth map and/or disparity map that is accurate may be more capable of distinguishing an accuracy of edges of the white wall 504 and/or the box 506 than a less accurate depth map and/or disparity map.

The structured light projector 106 may be configured to cast the structured light pattern SLP on the white wall 504 and the box 506. In one example, the structured light pattern SLP may be implemented as a speckle pattern comprising dots of a predetermined size. Generally, when the structured light pattern SLP is cast onto an object that is closer to the lens 160 of the capture device 104, the dots of the structured light pattern SLP may have a larger size than the dots of the structured light pattern SLP that have been cast onto an object that is farther away from the lens 160 of the capture device 104. For clarity and illustrative purposes to show differences in the speckle pattern on the white wall 504 and the box 506, the speckle pattern of dots for the structured light pattern SLP is only shown cast onto the white wall 504 and the box 506. Generally, the speckle pattern of dots for the structured light pattern SLP may be cast onto the entirety of the video frame 500 (e.g., on the floor/ground, on a ceiling, on any surfaces beside the white wall 504, etc.).

The speckle pattern of the structured light pattern SLP is shown as a pattern 514 on the white wall 504, a pattern 516 on the front face 508 of the box 506, a pattern 518 on the top 512 of the box 506 and a pattern 520 on the side 510 of the box 506. The dots of the pattern 514 may comprise small dots. The dots of the pattern 516 may comprise large dots. The dots of the pattern 518 and the dots of the pattern 520 may comprise medium-sized dots.

Since the front face 508 of the box 506 may be a closest surface to the lens 160, the pattern 516 may comprise dots with the largest size in the video frame 500. The side 510 and the top 512 of the box 506 may be farther away from the lens 160 than the front face 508, but closer to the lens 160 than the white wall 504. The dots of the pattern 518 on the top 512 and the dots of the pattern 520 on the side 510 may be smaller than the dots of the pattern 516 on the front face 508. Which of the dots of the pattern 518 or the dots of the pattern 520 are larger may depend on which surface (e.g., the side 510 or the top 512) is closer to the lens 160. Since the white wall 504 may be a surface the farthest away from the lens 160, the pattern 514 may comprise dots with the smallest size in the video frame 500.

The size of the dots in the patterns 514-520 of the structured light pattern SLP in the video frame 500 may be used by the processor 102 to determine a distance and/or depth of various objects captured in a video frame. The size of the dots in the patterns 514-520 may enable the processor 102 to generate a disparity map. The depth map and/or disparity map may be generated in response to the video frame captured using the monocular lens 160 and an analysis performed on the speckle patterns 514-520.

In one example, the processor 102 may be configured to perform a 480×272 IR channel graph to do adaptive binarization. By implementing the video pipeline of the processor 102 with the neural network module 190b (e.g., using the adaptive offset term and the quadruple domain method), the adaptive binarization may be performed in approximately 74 us (e.g., with Net id:0, Dags:1/1, vp_ticks:911). Running the adaptive binarization on a general purpose processor (e.g., an ARM processor), the generation time for the adaptive binarization (e.g., without the adaptive offset term) may be approximately 2 ms. The use of convolution performed using the hardware modules 204a-204n for binarization and/or the use of 4-connected domains for isolated points, connection points, and glitch points may provide a significant speed advantage compared to using a general purpose processor.

Figure 10:
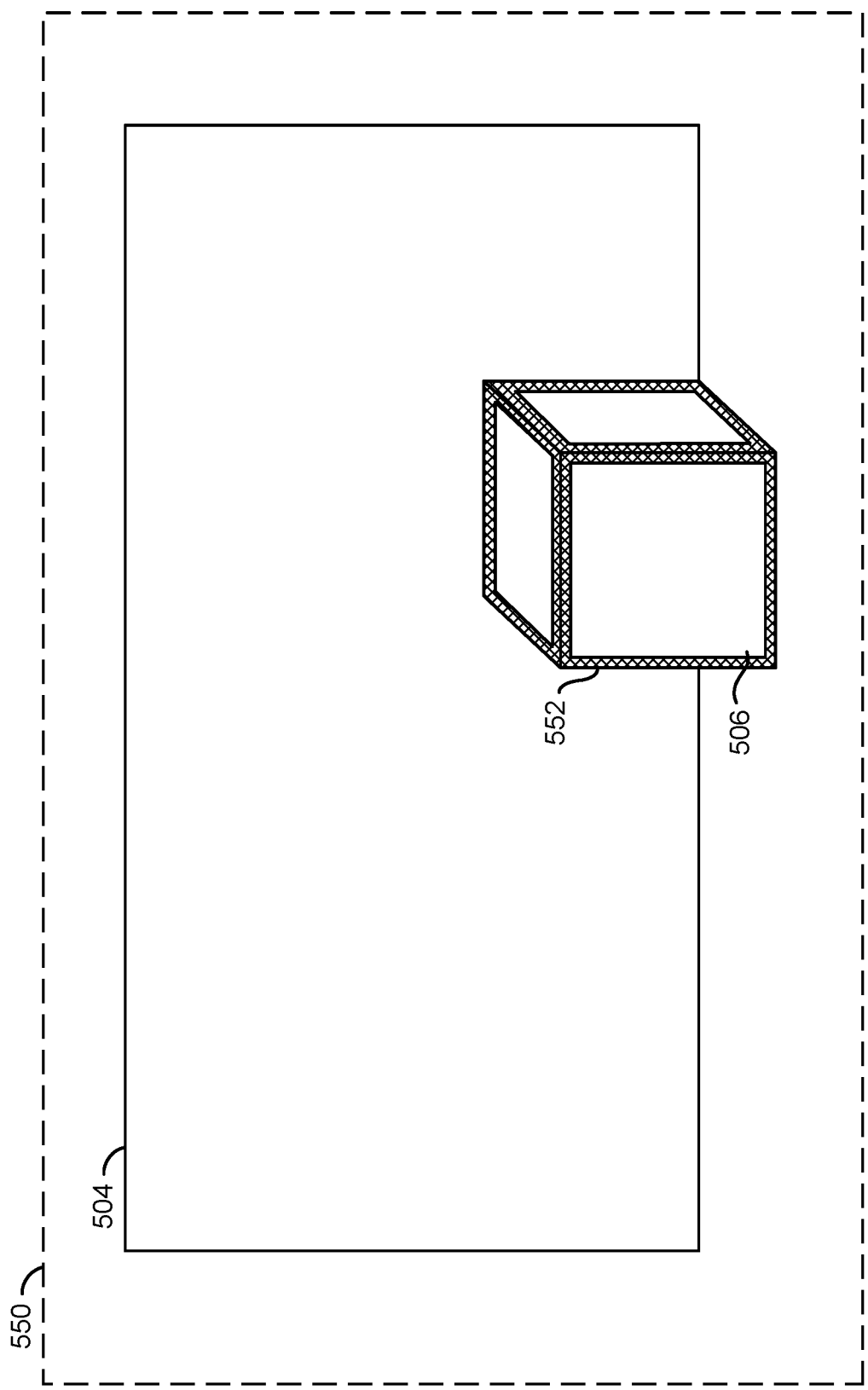
FIG. 10 is a diagram illustrating a disparity map generated from a speckle image after binarization without adding the adaptive offset value.

Referring to FIG. 10, a diagram illustrating a disparity map generated from a speckle image after binarization without adding the adaptive offset value is shown. A dotted box 550 is shown. The dotted box 550 may represent a disparity map. The disparity map 550 may be an example output generated by the processor 102 (e.g., the signal DIMAGES). In the example shown, the disparity map 550 may represent a disparity map generated without using the adaptive offset value 354. For example, the processor 102 may be configured to generate the signal DIMAGES by using the neural network operations 300-400 described in association with FIGS. 5-7 (e.g., high accuracy, efficient operations, lower power consumption) or without using the neural network operations 300-400 described in association with FIGS. 5-7 (e.g., less accurate, less efficient operations, more power consumption).

The white wall 504 and the box 506 are shown in the disparity map 550. The white wall 504 and the box 506 are shown without the speckle patterns 514-520. For example, the binarization may extract the speckle patterns 514-520 in order to enable the processor 102 to perform disparity calculations.

The box 506 is shown with edges 552. The edges 552 may have inaccuracies. In the example shown, the edges 552 are shown as generally fuzzy to illustrate the inaccuracies. The inaccuracies of the edges 552 may be present in the disparity map 550 because the adaptive offset term and/or other neural network operations were not used (e.g., other methods may generate inaccuracies that may be corrected when using the neural network operations 300-400 described in association with FIGS. 5-7).

A disparity error may be calculated for every pixel in a disparity map. In an example, a pixel may have a disparity error may be considered to have a disparity error if a disparity for a pixel is larger than 1 compared with a ground truth disparity. The ground truth disparity may be determined based on the real reference images. In an example, the processor 102 may be configured to perform a disparity error calculation.

The processor 102 may be further configured to calculate the proportion of disparity error for each pixel. The proportion of disparity error for each pixel may be determined by summing the total disparity error pixels and dividing the sum by the image size. The proportion of disparity error for each pixel may provide a measure of disparity quality for the disparity map 550. In the example shown, the proportion of disparity error for each pixel may be approximately 5.7%. The disparity error may result in the inaccuracies of the edges 552 in the disparity map 550.

Figure 11:
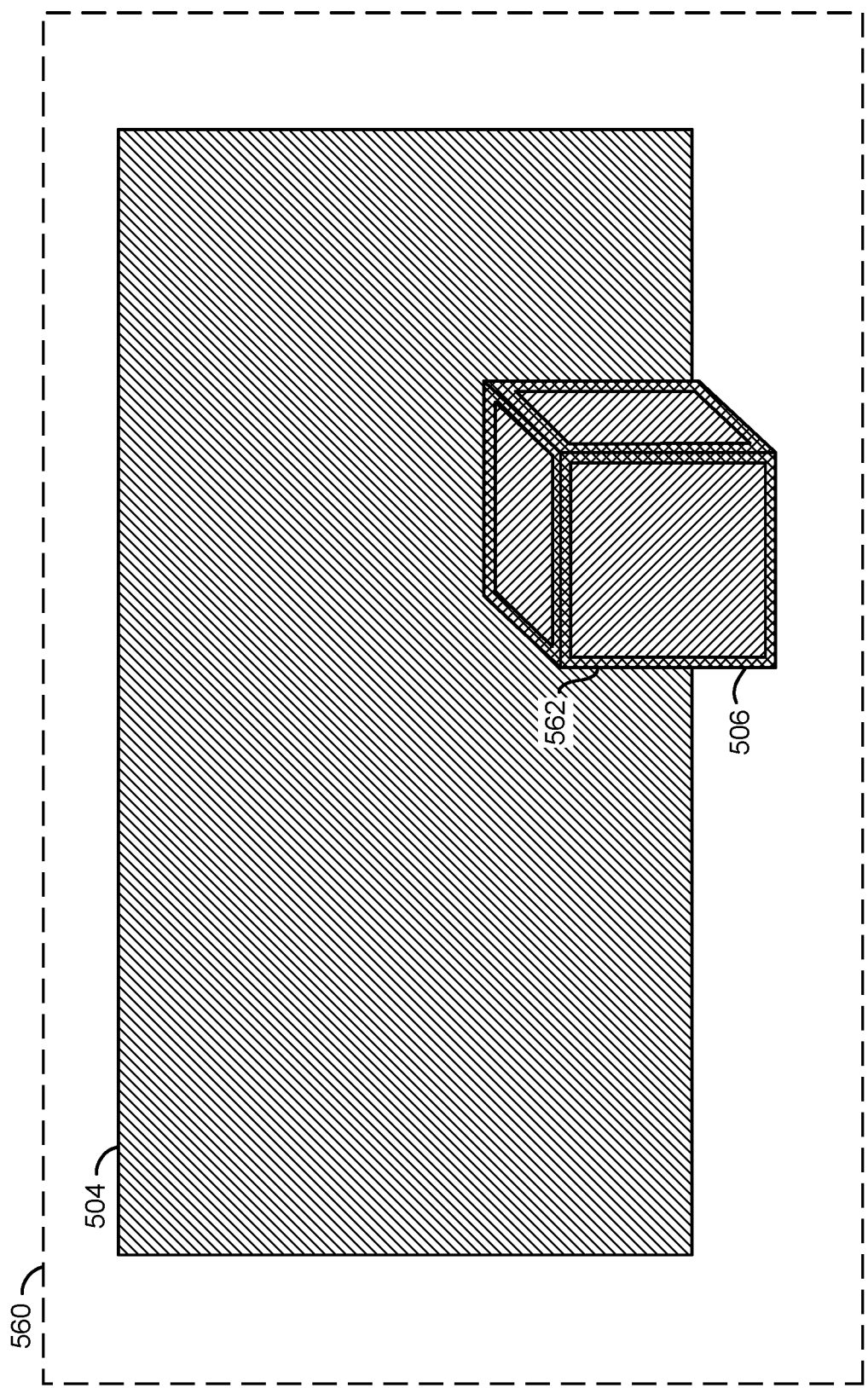
FIG. 11 is a diagram illustrating a depth map generated from a speckle image after binarization without adding the adaptive offset value.

Referring to FIG. 11, a diagram illustrating a depth map generated from a speckle image after binarization without adding the adaptive offset value is shown. A dotted box 560 is shown. The dotted box 560 may represent a depth map. The depth map 560 may be an example output generated by the processor 102 (e.g., the signal DIMAGES). In the example shown, the depth map 560 may represent a depth map generated without using the adaptive offset value 354. For example, the processor 102 may be configured to generate the signal DIMAGES by using the neural network operations 300-400 described in association with FIGS. 5-7 (e.g., high accuracy, efficient operations, lower power consumption) or without using the neural network operations 300-400 described in association with FIGS. 5-7 (e.g., less accurate, less efficient operations, more power consumption).

The white wall 504 and the box 506 are shown in the depth map 560. The white wall 504 and the box 506 are shown without the speckle patterns 514-520. For example, the binarization may extract the speckle patterns 514-520 in order to enable the processor 102 to perform depth calculations.

The box 506 is shown with edges 562. The edges 562 may have inaccuracies. In the example shown, the edges 562 are shown as generally fuzzy to illustrate the inaccuracies. The inaccuracies of the edges 562 may be present in the depth map 560 because the adaptive offset term and/or other neural network operations were not used (e.g., other methods may generate inaccuracies that may be corrected when using the neural network operations 300-400 described in association with FIGS. 5-7).

A Z-accuracy may be calculated in order to evaluate depth data accuracy in a depth image. The Z-accuracy may measure how close depth values reported in the depth image are to a ground truth value. The ground truth values may be determined based on the real reference images. In an example, the processor 102 may be configured to perform a Z-accuracy calculation.

A fill rate may be calculated in order to measure a proportion of the depth image containing valid pixels. Valid pixels may be pixels with non-zero depth values. The fill rate metric may be independent of the accuracy of the depth data. The processor 102 may be configured to perform the fill rate calculation.

In the example shown, the Z-accuracy of the depth image 560 may be approximately 94.3%. In the example shown, the fill rate of the depth image 560 may be approximately 97.3%. The low Z-accuracy value and/or the low fill rate measured may result in the inaccuracies of the edges 562 in the depth map 560.

Figure 12:
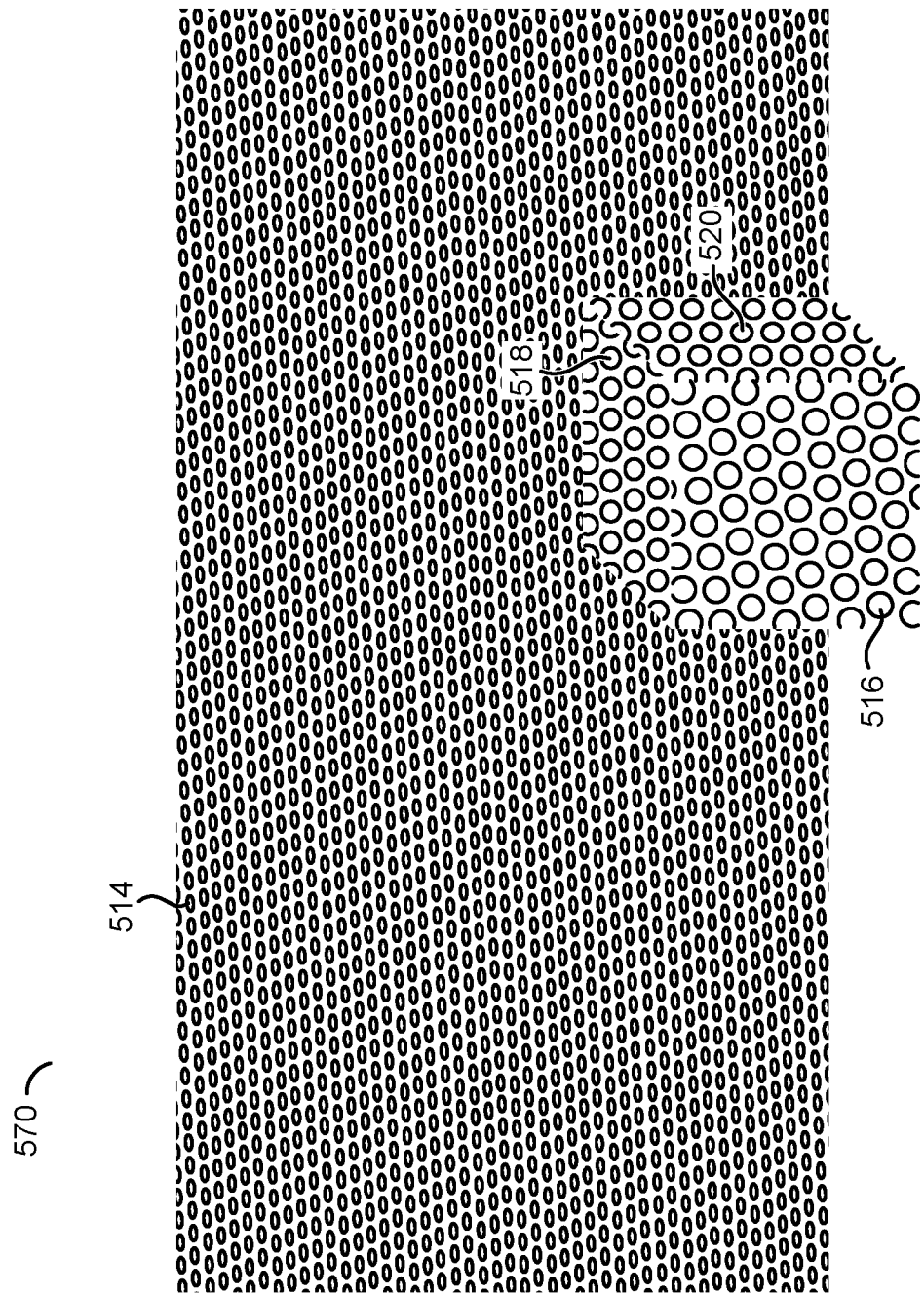
FIG. 12 is a diagram illustrating a binarization result generated from a speckle image in response to adding the adaptive offset value and removing error points.

Referring to FIG. 12, a diagram illustrating a binarization result generated from a speckle image in response to adding the adaptive offset value and removing error points is shown. A binarization result 570 is shown. The binarization result 570 may be generated in response to the neural network operations 300-400 described in association with FIGS. 5-7.

The speckle patterns 514-520 are shown in the binarization result 570. The processor 102 may be configured to implement the neural network operations 300-400, the binarization module 402 and/or the quadruple domain module 404 in order to generate the binarization result 570. The binarization result 570 may be the signal ERR generated in response to removing the error points from the signal BINVID after the adaptive offset value 354 has been added to the signal VIDEO (e.g., the source images or the real reference images) to generate the adaptive result ADVRES.

The binarization result 570 may extract the speckle patterns 514-520 from the captured image. In the example shown, the speckle patterns 514-520 are shown having the same dot sizes as shown in the captured video frame 500 shown in association with FIG. 9. However, the objects (e.g., the white wall 504 and the front face 508, the side 510 and the top 512 of the box 506) may not be directly visible. The processor 102 may be configured to determine the location, size and/or depth of the white wall 504 and the front face 508, the side 510 and the top 512 of the box 506 by inference based on the size of the dots in the speckle patterns 514-520.

The binarization result 570 may represent the binarization result generated in response to performing the neural network operations 300-400. A binarization result may be generated without using the neural network operations 300-400. For example, the disparity image 550 (shown in association with FIG. 10) and the depth image 560 (shown in association with FIG. 11) may be generated based on a binarization result generated without the neural network operations 300-400. The binarization result 570 generated in response to using the neural network operations 300-400 may provide higher accuracy and/or quality than when a binarization result is performed without the neural network operations 300-400.

A single point proportion may be calculated in order to evaluate binary quality of a binarization result. The single point proportion may comprise a calculation of single point numbers divided by all the point numbers. All the point numbers may comprise a sum of single point numbers, the isolated points 452, the connection points 454 and the glitch points 456 in one image after the pre-processing binary. The processor 102 may be configured to perform a single point proportion calculation. In the example shown, the binarization result 570 may have a single point proportion of 95.4%. Without performing the neural network operations 300-400, the binarization result used to generate the disparity image 550 and the depth image 560 may have a single point proportion of 90.2%. By implementing the neural network operations 300-400 to add the adaptive bias 354, the binarization result 570 may have a 5.2% improvement for the single point proportion metric.

Figure 13:
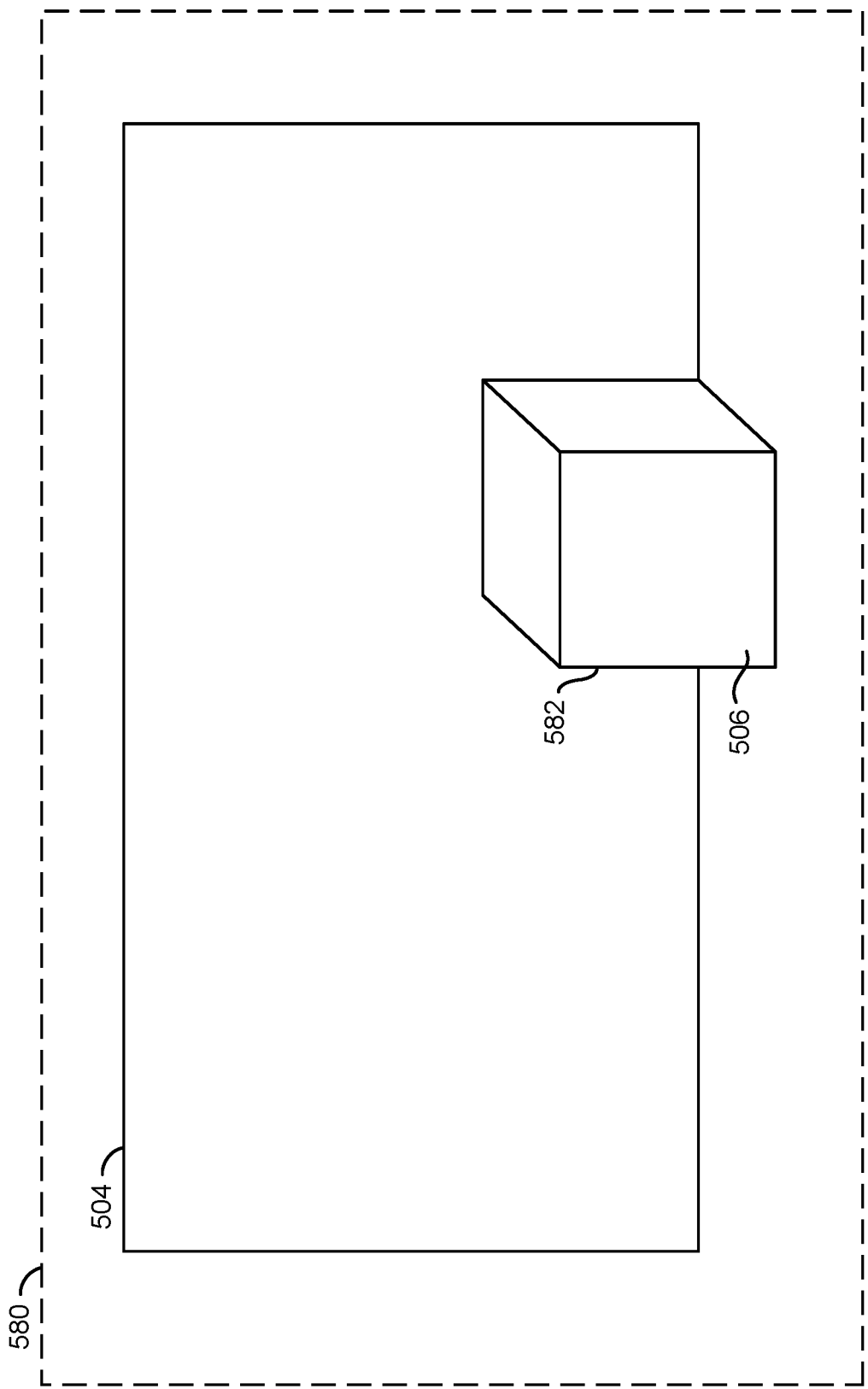
FIG. 13 is a diagram illustrating a disparity map generated from a speckle image after binarization in response to adding the adaptive offset value and removing error points.

Referring to FIG. 13, a diagram illustrating a disparity map generated from a speckle image after binarization in response to adding the adaptive offset value and removing error points is shown. A dotted box 580 is shown. The dotted box 580 may represent a disparity map. The disparity map 580 may be an example output generated by the processor 102 (e.g., the signal DIMAGES). In the example shown, the disparity map 580 may represent a disparity map generated using the adaptive offset value 354. For example, the processor 102 may be configured to generate the signal DIMAGES by using the neural network operations 300-400 described in association with FIGS. 5-7.

The disparity map 580 may represent a result generated by the processor 102 after the adaptive offset 354 has been added to the source images or the reference images, after the binarization result 570 has been generated and after the error points 452-456 have been removed. In an example, the binary data (e.g., binary result in the signal ERR) may be generated for the source images and the reference images during the preprocessing. The preprocessing results may be used to generate the disparity map 580. In an example, one or more of the hardware modules 190a-190n implemented by the processor 102 may be configured to perform matching operations using the preprocessing results as input in order to generate the disparity map 580.

The white wall 504 and the box 506 are shown in the disparity map 580. The white wall 504 and the box 506 are shown without the speckle patterns 514-520. For example, the binarization result 570 may extract the speckle patterns 514-520 in order to enable the processor 102 to perform disparity calculations.

The box 506 is shown with edges 582. The edges 582 may be distinctly represented. In the example shown, the edges 582 are shown as distinct to illustrate the accuracy of the resulting disparity image. The accuracy of the edges 582 may be present in the disparity map 580 because the adaptive offset term and/or other neural network operations were used (e.g., the neural network operations 300-400 described in association with FIGS. 5-7).

In the example shown, for the disparity map 580, the proportion of disparity error for each pixel may be approximately 1.8%. In the disparity image 550 shown in association with FIG. 10, the proportion of disparity error for each pixel may be approximately 5.7%. By implementing the neural network operations 300-400, the processor 102 may generate the disparity map 580 with an error disparity with a 3.9% reduction after adding the adaptive bias 354. The reduction in error disparity may enable the distinct edges 582 to be defined for the box 506 in the disparity image 580.

Figure 14:
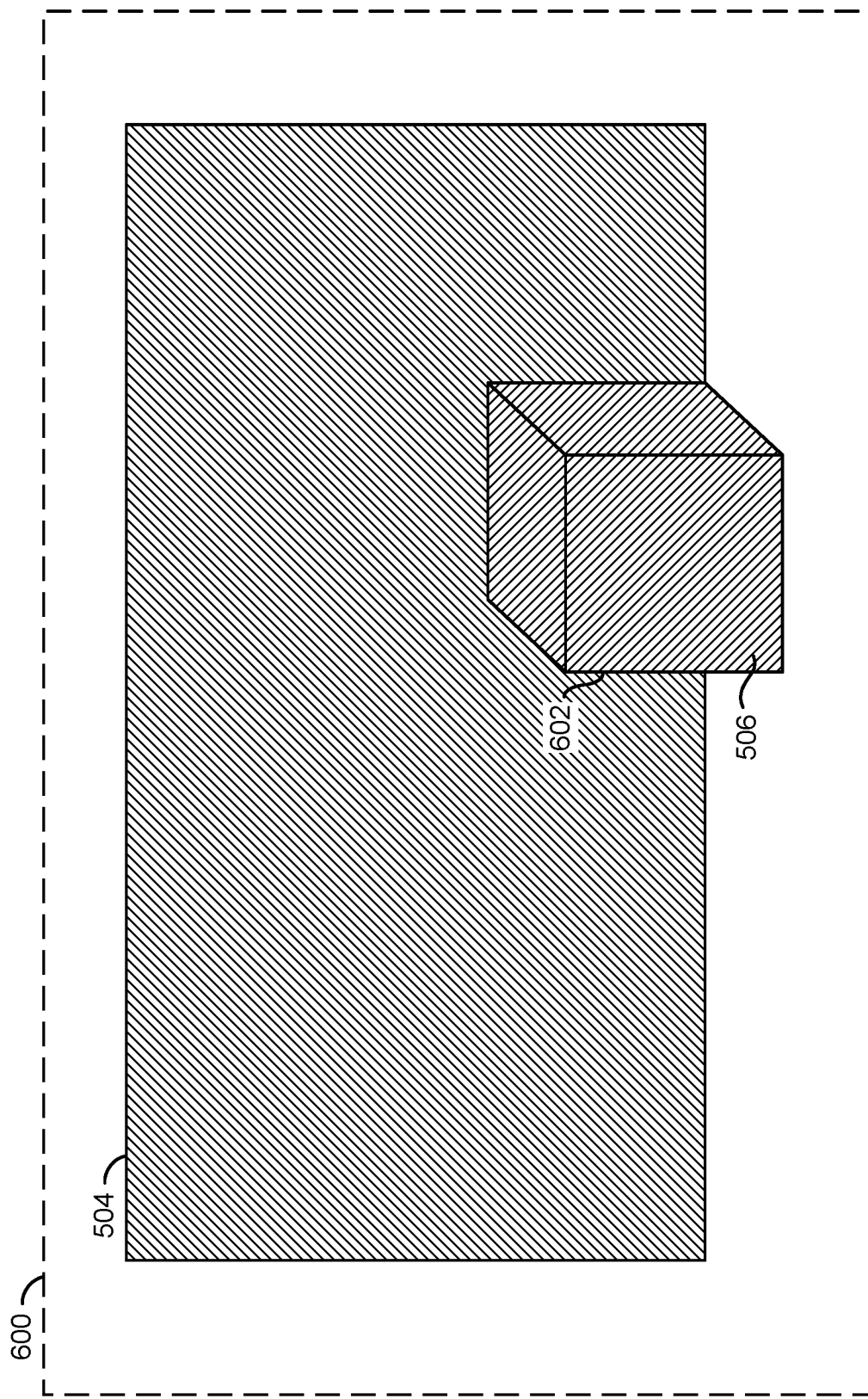
FIG. 14 is a diagram illustrating a depth map generated from a speckle image after binarization in response to adding the adaptive offset value and removing error points.

Referring to FIG. 14, a diagram illustrating a depth map generated from a speckle image after binarization in response to adding the adaptive offset value and removing error points is shown. A dotted box 600 is shown. The dotted box 600 may represent a depth map. The depth map 600 may be an example output generated by the processor 102 (e.g., the signal DIMAGES). In the example shown, the depth map 600 may represent a depth map generated using the adaptive offset value 354. For example, the processor 102 may be configured to generate the signal DIMAGES by using the neural network operations 300-400 described in association with FIGS. 5-7.

The depth map 600 may represent a result generated by the processor 102 after the adaptive offset 354 has been added to the source images or the reference images, after the binarization result 570 has been generated and after the error points 452-456 have been removed. In an example, the binary data (e.g., binary result in the signal ERR) may be generated for the source images and the reference images during the preprocessing. The preprocessing results may be used to generate the depth map 600. In an example, one or more of the hardware modules 190a-190n implemented by the processor 102 may be configured to perform matching operations using the preprocessing results as input in order to generate the depth map 600.

The white wall 504 and the box 506 are shown in the depth map 600. The white wall 504 and the box 506 are shown without the speckle patterns 514-520. For example, the binarization result 570 may extract the speckle patterns 514-520 in order to enable the processor 102 to perform depth calculations.

The box 506 is shown with edges 602. The edges 602 may be distinctly represented. In the example shown, the edges 602 are shown as distinct to illustrate the accuracy of the resulting depth image. The accuracy of the edges 602 may be present in the depth map 600 because the adaptive offset term and/or other neural network operations were used (e.g., the neural network operations 300-400 described in association with FIGS. 5-7).

In the example shown, the Z-accuracy of the depth map 600 may be approximately 96.4% and the fill rate may be approximately 98.4%. In the depth image 560 shown in association with FIG. 11, the Z-accuracy may be approximately 94.3% and the fill rate may be approximately 97.3%. By implementing the neural network operations 300-400, the processor 102 may generate the depth map 600 with a 2.1% improvement in Z-accuracy and a 1.1% improvement in fill rate after adding the adaptive bias 354. The improvement in Z-accuracy and fill rate may enable the distinct edges 602 to be defined for the box 506 in the depth map 600.

Figure 15:
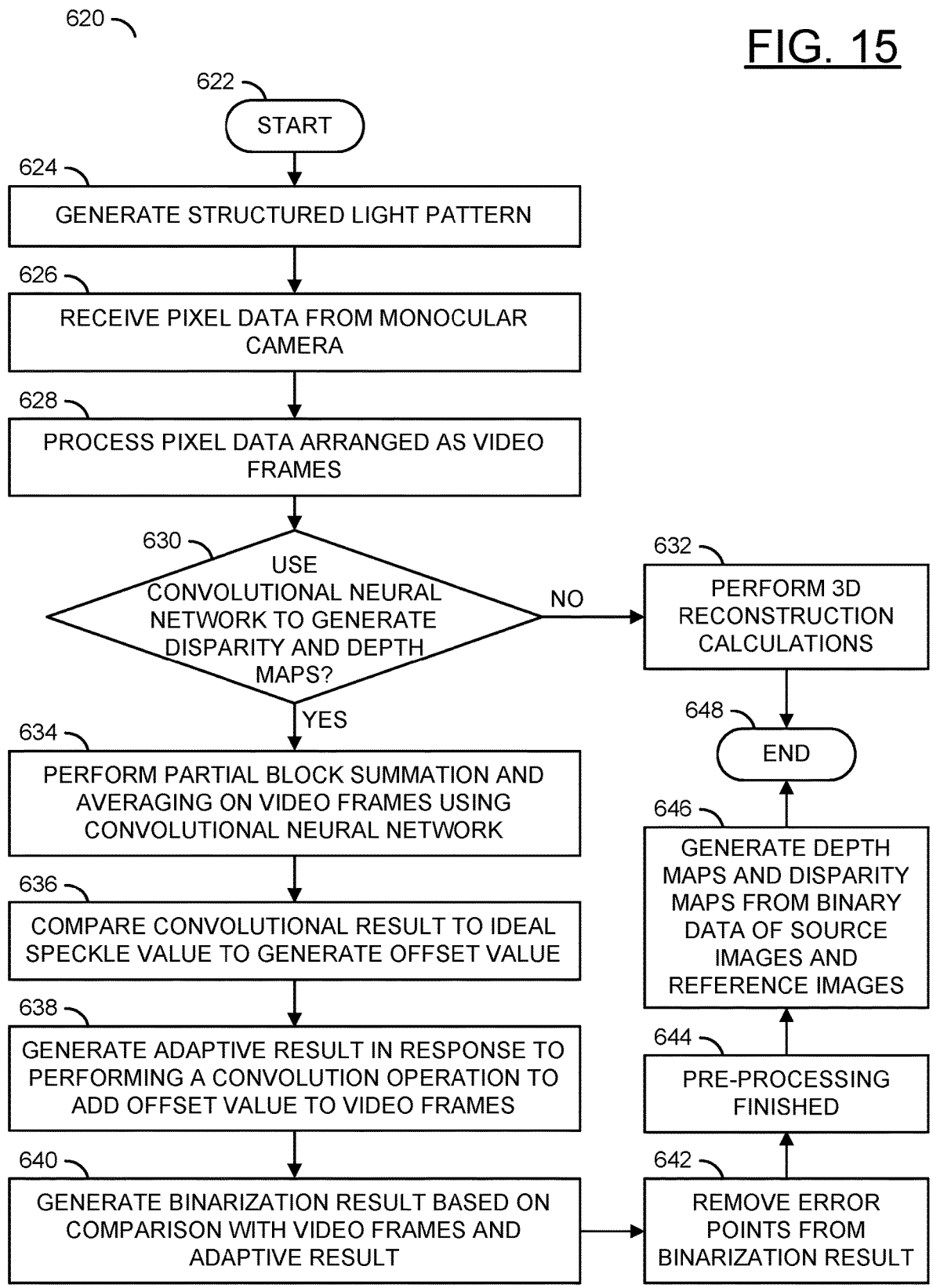
FIG. 15 is a flow diagram illustrating a method for preprocessing video frames by adding an adaptive offset term using convolution techniques to a local adaptive binarization expression.

Referring to FIG. 15, a method (or process) 620 is shown. The method 620 may preprocess video frames by adding an adaptive offset term using convolution techniques to a local adaptive binarization expression. The method 620 generally comprises a step (or state) 622, a step (or state) 624, a step (or state) 626, a step (or state) 628, a decision step (or state) 630, a step (or state) 632, a step (or state) 634, a step (or state) 636, a step (or state) 638, a step (or state) 640, a step (or state) 642, a step (or state) 644, a step (or state) 646, and a step (or state) 648.

The step 622 may start the method 620. In the step 624, the structured light projector 106 may generate the structured light pattern SLP. In an example, the SLP source 186 may generate the signal SLP comprising a speckle pattern that may be projected onto the environment near the apparatus 100. Next, in the step 626, the processor 102 may receive pixel data from the monocular camera. In an example, the capture device 104 may implement a monocular camera. The monocular camera 104 may receive the signal LIN comprising light via the lens 160. The RGB-IR sensor 180 may convert the input light into pixel data and/or video frames. The pixel data may comprise information about the environment near the apparatus 100 and capture the structured light pattern generated by the structured light projector 106. The monocular camera 104 may present the signal VIDEO to the processor 102. In the step 628, the processor 102 may be configured to process the pixel data arranged as video frames. In one example, the processor 102 may convert the pixel data into video frames. In another example, the capture device 104 may convert the pixel data to video frames and the video frames may be presented to the processor 102. The video frames may comprise single-channel source images or single-channel reference images. Next, the method 620 may move to the decision step 630.

In the decision step 630, the processor 102 may determine whether to utilize the CNN module 190b to generate the disparity maps and depth maps. If the CNN module 190b is not used, then the method 620 may move to the step 632. In the step 632, the processor 102 may perform various 3D reconstruction calculations without relying on the hardware acceleration provided by the CNN module 190*b* (e.g., slower computation path that does not rely on the hardware engines 204*a*-204*n* and/or does not add the adaptive offset value 354, which may result in the inaccuracies 552 shown in the disparity map 550 and/or the inaccuracies 562 shown in the depth map 560). Next, the method 620 may move to the step 648. In the decision step 630, if the CNN module 190*b* is used, then the method 620 may move to the step 634.

In the step 634, the CNN module 190*b* may perform a partial block summation and an averaging on the video frames. In an example, the partial block summation and the averaging may enable the convolution result 308 to be generated for source images or reference images. Next, in the step 636, the CNN module 190*b* may compare the convolution result 308 to the ideal speckle value 352 to generate the offset value 354. In the step 638, the CNN module 190*b* may perform a convolution operation in order to add the offset value 354 to the video frames (e.g., the source images or the reference images) to generate the adaptive result 412. Next, in the step 640, the CNN module 190*b* may compare the video frames (e.g., the source images in the signal VIDEO if the adaptive result 412 is from source images, or the reference images in the signal VIDEO if the adaptive result 412 is from the real reference images) to the adaptive result 412 to generate the binarization result (e.g., the signal BINVID). In the step 642, the CNN module 190*b* may be configured to remove the error points (e.g., the isolated points 452, the connection points 454 and/or the glitch points 456) from the binarization result BINVID. The result of the removal of the error points may be the binary data (e.g., the signal ERR, which may correspond to source binary data when the video frames signal VIDEO comprises source images and may correspond to real binary data when the video frames signal VIDEO comprises real reference images). Next, the method 620 may move to the step 644.

In the step 644, the CNN module 190*b* may finish the preprocessing of the video frames (e.g., the source images or the real reference images). Next, in the step 646, the processor 102 may generate the disparity maps 580 and the depth maps 600. The disparity maps 580 and the depth maps 600 may be generate from the binary data for the source images and the reference images (e.g., input to a matching operation method). Next, the method 620 may move to the step 648. The step 648 may end the method 620.

Figure 16:
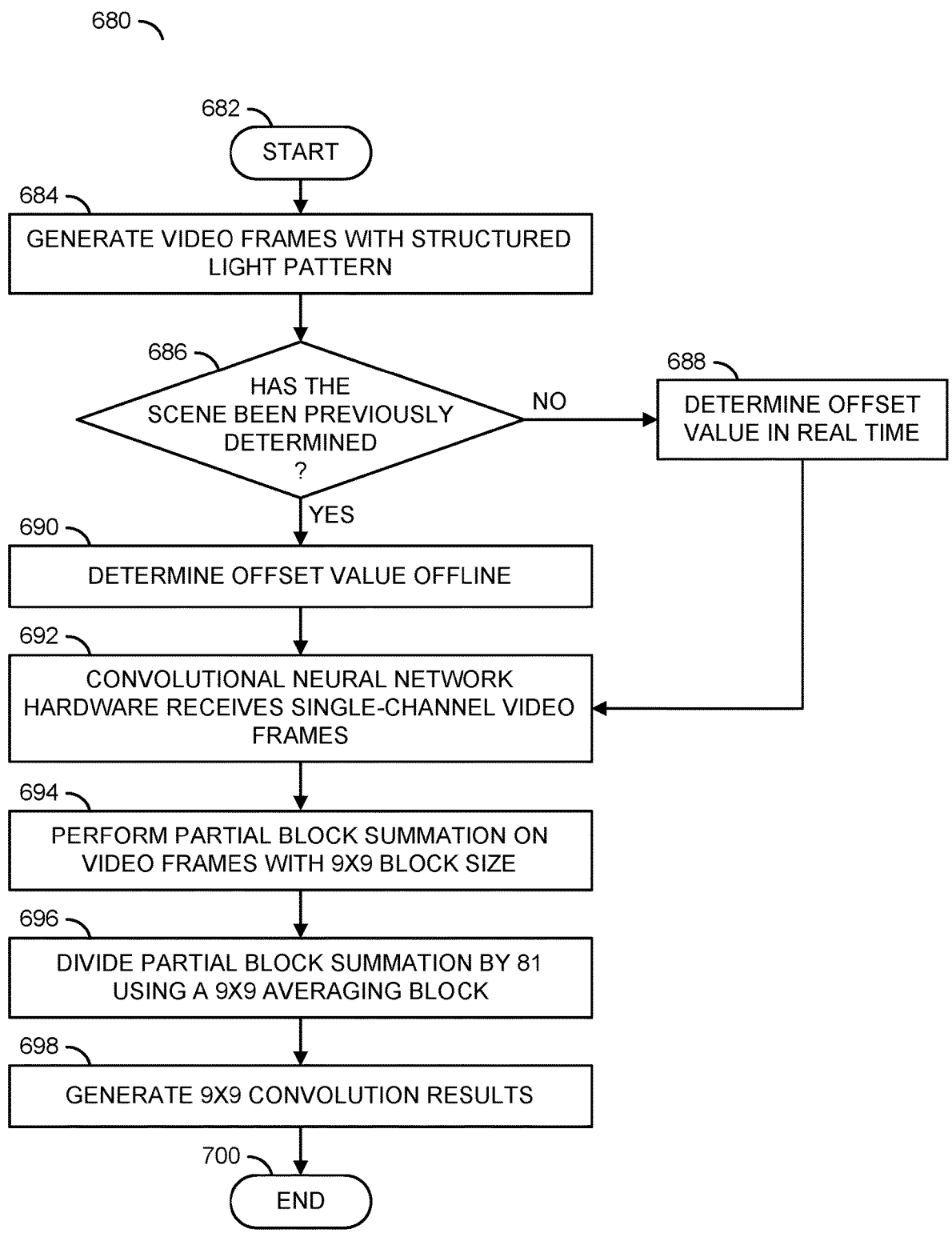
FIG. 16 is a flow diagram illustrating a method for performing a partial block summation and averaging using a convolutional neural network.

Referring to FIG. 16, a method (or process) 680 is shown. The method 680 may perform a partial block summation and average using a convolutional neural network. The method 680 generally comprises a step (or state) 682, a step (or state) 684, a decision step (or state) 686, a step (or state) 688, a step (or state) 690, a step (or state) 692, a step (or state) 694, a step (or state) 696, a step (or state) 698, and a step (or state) 700.

The step 682 may start the method 680. In the step 684, the processor 102 may generate video frames that captured the structured light pattern SLP. Next, the method 680 may move to the decision step 686. In the decision step 686, the processor 102 may determine whether the scene captured has been previously determined. The scene may previously be determined if the distance information and/or 3D information is known in advance. In an example, the scene may be previously determined for the real reference video frames. If the scene has previously been determined, then the method 680 may move to the step 688. In the step 688, the processor 102 may determine the offset value 354 in real time (e.g., analysis of source images). Next, the method 680 may move to the step 692. In the decision step 686, if the scene has been previously determined, then the method 680 may move to the step 690. In the step 690, the processor 102 may determine the offset value 354 offline (e.g., analysis of reference images). Next, the method 680 may move to the step 692.

In the step 692, the hardware-implemented CNN module 190*b* may receive the single-channel video frames (e.g., the source images or the real reference images from the monocular camera 104). Next, in the step 694, the CNN module 190*b* may generate the partial block summation 304. The partial block summation 304 may be generated from source images or reference images. In the step 694, the CNN module 190*b* (e.g., using one or more of the hardware engines 204*a*-204*n*) may divide the partial block summation 304 by 81 using the 9×9 averaging block 306. Next, in the step 696, the CNN module 190*b* may generate the 9×9 convolution result 308 (e.g., the signal CONVRES). Next, the method 680 may move to the step 700. The step 700 may end the method 680.

Figure 17:
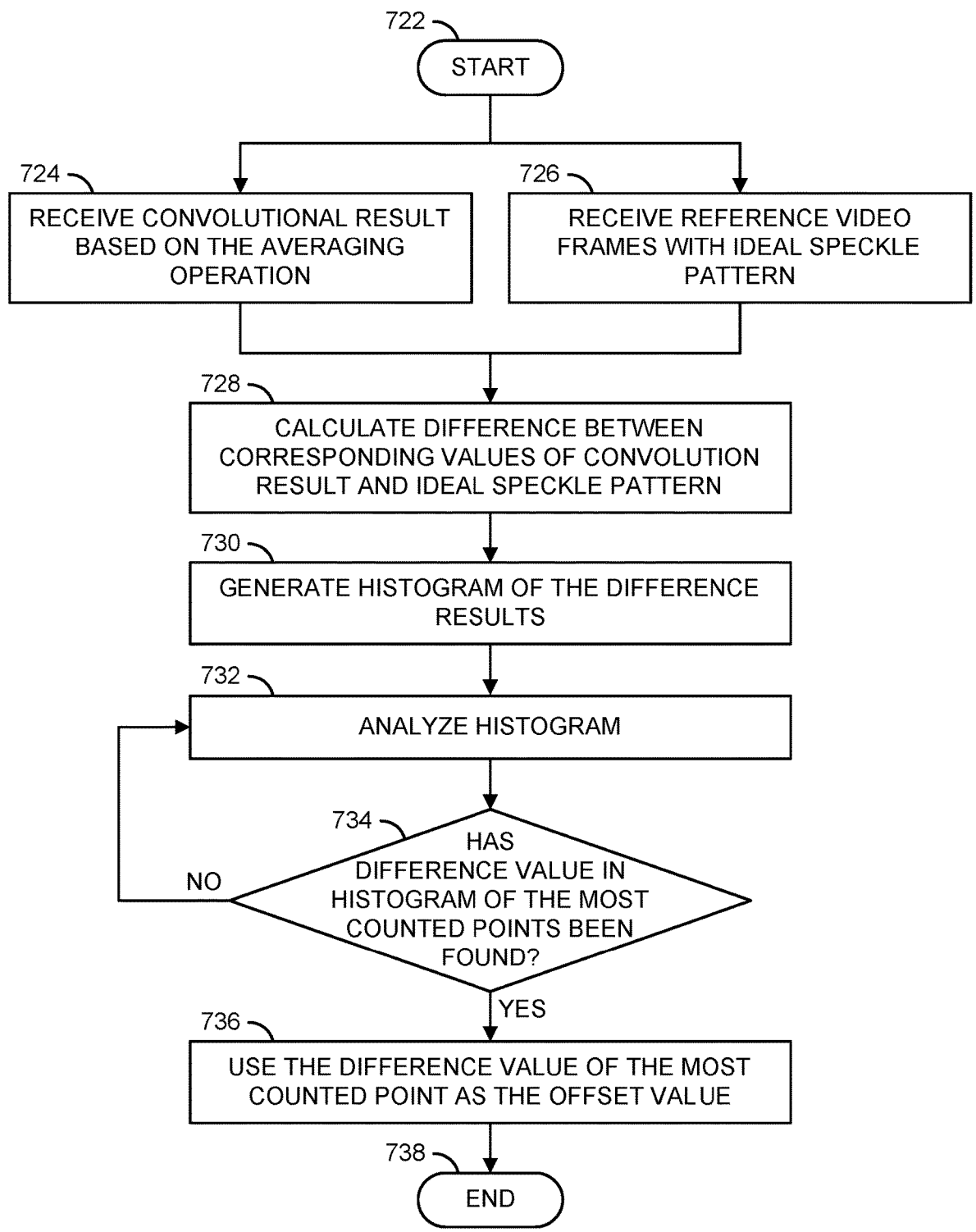
FIG. 17 is a flow diagram illustrating a method for determining an offset value.

Referring to FIG. 17, a method (or process) 720 is shown. The method 720 may determine an offset value. The method 720 generally comprises a step (or state) 722, a step (or state) 724, a step (or state) 726, a step (or state) 728, a step (or state) 730, a step (or state) 732, a decision step (or state) 734, a step (or state) 736, and a step (or state) 738.

The step 722 may start the method 720. Next, the method 720 may move to the step 724 and the step 726, which may be performed in parallel or substantially in parallel. In the step 724, the CNN module 190*b* may receive (or determine) the convolution result 308 based on the averaging operation (as shown in association with FIG. 5). Next, the method 720 may move to the step 728. In the step 726, the CNN module 190*b* may receive the signal IDEAL comprising the ideal speckle image pattern 352. Next, the method 720 may move to the step 728.

In the step 728, the CNN module 190*b* may calculate the difference between the corresponding values of the convolution result 308 and the ideal speckle image pattern 352. Next, in the step 730, the CNN module 190*b* may generate a histogram of the difference results of the comparison between the convolution result 308 and the ideal speckle image pattern 352. In the step 732, the CNN module 190*b* may analyze the histogram generated. Next, the method 720 may move to the decision step 734.

In the decision step 734, the CNN module 190*b* may determine whether the difference value in the histogram of the most counted points been found. If the most counted point in the histogram has not been found, then the method 720 may return to the step 732 (e.g., continue generating and/or analyzing the histogram). If the most counted point in the histogram has been found, then the method 720 may move to the step 736. In the step 736, the CNN module 190*b* may use the difference value of the most counted point in the histogram as the offset value 354 (e.g., the signal OFFSET). Next, the method 720 may move to the step 738. The step 738 may end the method 720.

Figure 18:
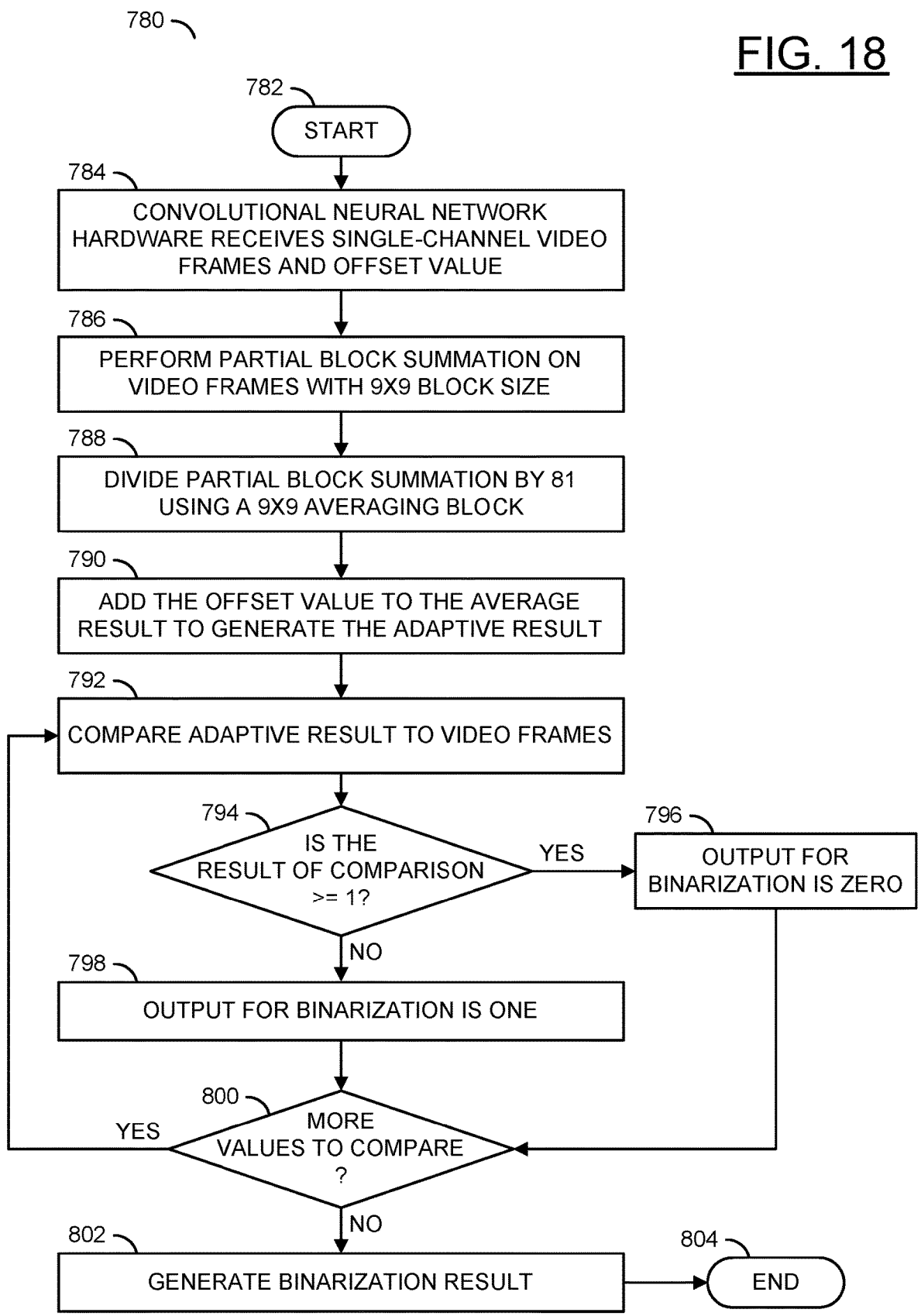
FIG. 18 is a flow diagram illustrating a method for generating an adaptive result by adding the offset value and generating a binarization result.

Referring to FIG. 18, a method (or process) 780 is shown. The method 780 may generate an adaptive result by adding the offset value and generate a binarization result. The method 780 generally comprises a step (or state) 782, a step (or state) 784, a step (or state) 786, a step (or state) 788, a step (or state) 790, a step (or state) 792, a decision step (or state) 794, a step (or state) 796, a step (or state) 798, a decision step (or state) 800, a step (or state) 802, and a step (or state) 804.

The step 782 may start the method 780. In the step 784, the hardware of the CNN module 190*b* may receive the signal-channel video frames (e.g., the signal VIDEO) and the offset value 354 (e.g., determined as shown in association with FIG. 6). Next, in the step 786, the CNN module 190*b* may perform the partial block summation 410 on the video frames (e.g., source images or real reference images) with a 9×9 block size. In the step 788, the CNN module 190*b* may divide the partial block summation 410 by 81 using the 9×9 averaging block 306. Next, the method 780 may move to the step 790.

In the step 790, the CNN module 190*b* may add the offset value 354 to the average result determined in the step 788, in order to generate the adaptive result 412. The adaptive result 412 may be determined in response to a convolution operation. Next, in the step 792, the binarization module 402 (e.g., one of the hardware engines 204*a*-204*n* implemented for the CNN module 190*b*) may compare the adaptive result 412 (e.g., the signal ADVRES) to the source video frames (e.g., the source images or the real reference images in the signal VIDEO). Next, the method 780 may move to the decision step 794.

In the decision step 794, the binarization module 402 may determine whether the result of the comparison of the adaptive result 412 and the video frames (e.g., of a corresponding value from the adaptive result 412 and the video frame) is greater than or equal to a value of one. If the result is greater than or equal to one, then the method 780 may move to the step 796. In the step 796, the binarization module 402 may output a value for the corresponding point of zero for the binarization result. Next, the method 780 may move to the decision step 800. In the decision step 794, if the result is not greater than or equal to one (e.g., less than one), then the method 780 may move to the step 798. In the step 798, the binarization module 402 may output a value for the corresponding point of one for the binarization result. Next, the method 780 may move to the decision step 800.

In the decision step 800, the CNN module 190*b* may determine whether there are more values to compare between the adaptive result 412 and the video frames. While the method 780 may illustrate the comparisons as being performed in sequence, the CNN module 190*b*, the hardware engines 204*a*-204*n* and/or the binarization module 402 may be configured to compare the corresponding values of the adaptive result 412 and the video frames in parallel computations or in operations performed substantially in parallel. If there are more values to compare, then the method 780 may return to the step 792. If there are no more values to compare, then the method 780 may move to the step 802.

In the step 802, the binarization module 402 may generate the binarization result (e.g., the signal BINVID). In some embodiments, the binarization result may be the binarization result for source images (e.g., if the signal VIDEO comprised the source images). In some embodiments, the binarization result may be the binarization result for real reference images (e.g., if the signal VIDEO comprised the real reference images). Next, the method 780 may move to the step 804. The step 804 may end the method 780.

Figure 19:
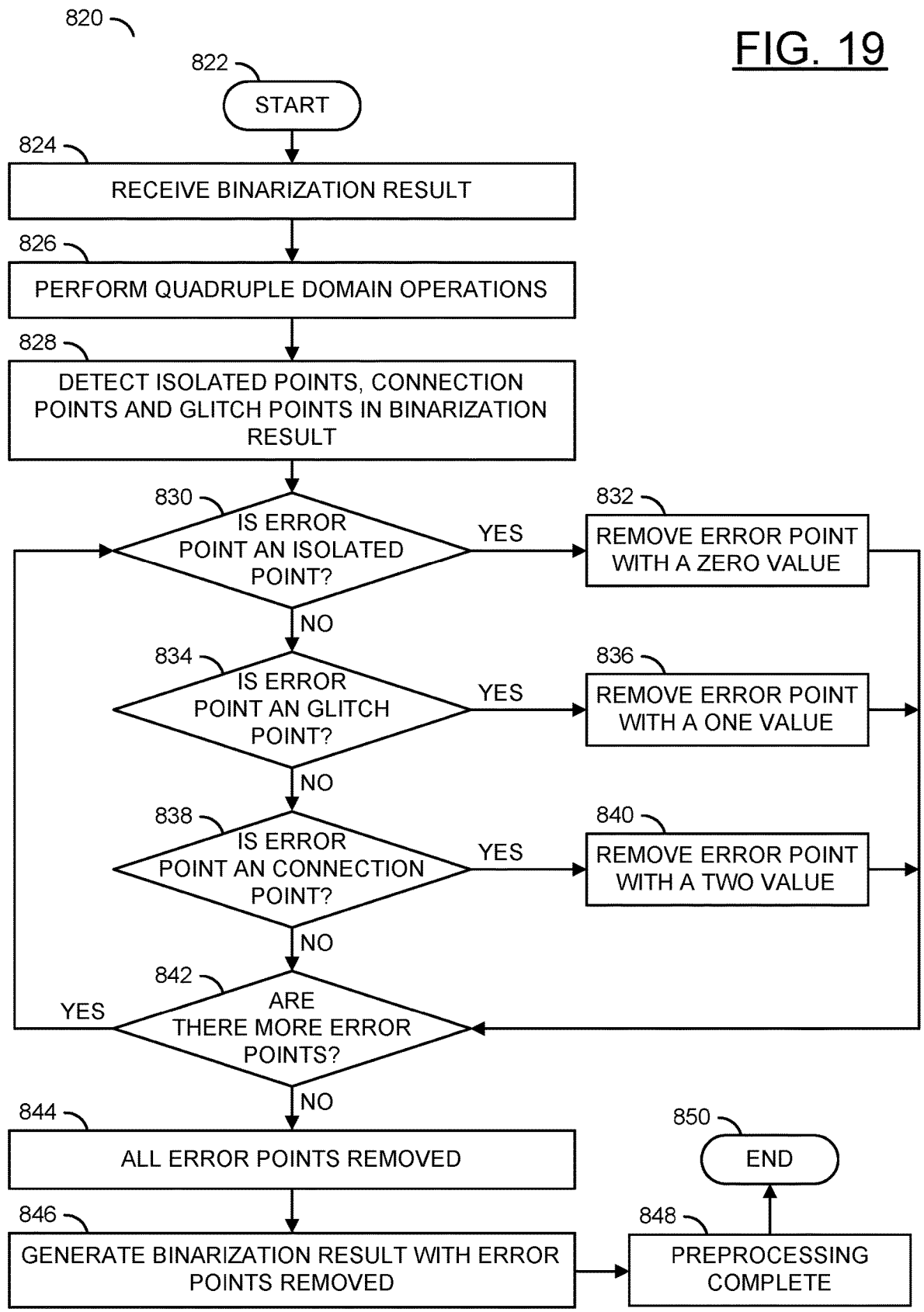
FIG. 19 is a flow diagram illustrating a method for removing error points to generate binary data.

Referring to FIG. 19, a method (or process) 820 is shown. The method 820 may remove error points to generate binary data. The method 820 generally comprises a step (or state) 822, a step (or state) 824, a step (or state) 826, a step (or state) 828, a decision step (or state) 830, a step (or state) 832, a decision step (or state) 834, a step (or state) 836, a decision step (or state) 838, a step (or state) 840, a decision step (or state) 842, a step (or state) 844, a step (or state) 846, a step (or state) 848, and a step (or state) 850.

The step 822 may start the method 820. Next, in the step 824, the quadruple domain module 404 (e.g., one of the hardware engines 204*a*-204*n* implemented for the CNN module 190*b*) may receive the binarization result (e.g., the signal BINVID). The binarization result may be for source images or reference images. In the step 826, the quadruple domain module 404 may perform quadruple domain operations on the binarization result BINVID. Next, in the step 828, the quadruple domain module 404 may detect the isolated points 452, the connection points 454 and the glitch points 456 in the binarization result BINVID. Next, the method 820 may move to the decision step 830.

In the decision step 830, the quadruple domain module 404 may determine whether the error point 452-456 detected is the isolated point 460. If the error point 452-456 is the isolated point 460, then the method 820 may move to the step 832. In the step 832, the quadruple domain module 404 may remove the error point with a zero value. Next, the method 820 may move to the decision step 842. In the decision step 830, if the error point 452-456 is not the isolated point 460, then the method 820 may move to the decision step 834.

In the decision step 834, the quadruple domain module 404 may determine whether the error point 452-456 detected is the glitch point 470. If the error point 452-456 is the glitch point 470, then the method 820 may move to the step 836. In the step 836, the quadruple domain module 404 may remove the error point with a one value. Next, the method 820 may move to the decision step 842. In the decision step 834, if the error point 452-456 is not the glitch point 470, then the method 820 may move to the decision step 838.

In the decision step 838, the quadruple domain module 404 may determine whether the error point 452-456 detected is the connection point 464. If the error point 452-456 is the connection point 464, then the method 820 may move to the step 840. In the step 840, the quadruple domain module 404 may remove the error point with a two value. Next, the method 820 may move to the decision step 842. In the decision step 838, if the error point 452-456 is not the connection point 464, then the method 820 may move to the decision step 842.

In the decision step 842, the quadruple domain module 404 may determine whether there are more of the error points 452-456. While the method 820 may illustrate the detection of the error points 452-456 as being performed in sequence, the CNN module 190*b*, the hardware engines 204*a*-204*n* and/or the quadruple domain module 404 may be configured to analyze, detect and/or remove the error points 452-456 in parallel computations or in operations performed substantially in parallel. If there are more error points 452-456, then the method 820 may return to the decision step 830. If there are no more of the error points 452-456, then the method 820 may move to the step 844.

In the step 844, the quadruple domain module 404 may determine that all of the error points 452-456 have been removed from the binarization result BINVID. Next, in the step 846, the quadruple domain module 404 may generate the binarization result with the error points removed (e.g., the binary data in the signal ERR). In some embodiments, the binary data in the signal ERR may be source binary data determined from the source images. In some embodiments, the binary data in the signal ERR may be reference binary date determined from the real reference images. In the step 848, the preprocessing performed by the CNN module 190*b* may be complete. For example, the source binary data and/or the reference binary date in the signal ERR may be used by other upcoming operations performed by the processor 102. The source binary data and/or the reference binary data may be used by the processor 102 to generate the disparity map 580 and/or the depth map 600. Next, the method 820 may move to the step 850. The step 850 may end the method 820.

The functions performed by the diagrams of FIGS. 1-19 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data;
a structured light projector configured to generate a structured light pattern; and
a processor configured to (i) process said pixel data arranged as video frames, (ii) perform operations using a convolutional neural network to determine a binarization result and an offset value and (iii) generate a disparity map and a depth map in response to (a) said video frames, (b) said structured light pattern, (c) said binarization result, (d) said offset value and (e) a removal of error points, wherein said convolutional neural network:
(A) performs a partial block summation and an average on said video frames to generate a convolution result,
(B) compares said convolution result to an ideal speckle value to determine said offset value,
(C) generates an adaptive result in response to performing a convolution operation to add said offset value to said video frames,
(D) compares said video frames to said adaptive result to generate said binarization result for said video frames, and
(E) removes said error points from said binarization result.

2. The apparatus according to claim 1, wherein said error points are removed using a quadruple domain method.

3. The apparatus according to claim 2, wherein said error points comprise at least one of isolated points, connection points and glitch points.

4. The apparatus according to claim 3, wherein said quadruple domain method is configured to remove (i) said isolated points with a zero value, (ii) said glitch points with a one value and (iii) said connection points with a two value.

5. The apparatus according to claim 1, wherein said offset value is configured to (i) separate said structured light pattern from a background image and (ii) reduce a number of said error points.

6. The apparatus according to claim 1, wherein said convolutional neural network is configured to remove said error points after generating said binarization result in order to reduce a probability of error matching in upcoming operations.

7. The apparatus according to claim 1, wherein said convolutional neural network is configured to generate said binarization result to enable use of convolution operations to perform area summation and add offset operations.

8. The apparatus according to claim 1, wherein said partial block summation is implemented with a block size of 9×9 to enable a 9×9 convolution to replace an averaging operation.

9. The apparatus according to claim 8, wherein values for said 9×9 convolution are each 81 values and a step size for said 9×9 convolution is one.

10. The apparatus according to claim 1, wherein said ideal speckle value is determined in response to capturing video data of projecting said structured light pattern against a white wall at a maximum ideal distance of said structured light projector.

11. The apparatus according to claim 1, wherein said partial block summation and determining said offset value is performed during offline training of said apparatus.

12. The apparatus according to claim 1, wherein said partial block summation and determining said offset value is performed in real-time operation of said apparatus.

13. The apparatus according to claim 1, wherein said offset value is determined in response to (i) calculating a difference of each corresponding value of said structured light pattern captured in said video frames and said ideal speckle value, (ii) using a histogram to determine a difference result between said corresponding value of said structured light pattern captured in said video frames and said ideal speckle value and (iii) using said difference of a most counted points in said histogram as said offset value.

14. The apparatus according to claim 1, wherein said video frames comprise images of a scene with said structured light pattern.

15. The apparatus according to claim 1, wherein (i) said convolutional neural network is configured to generate said binarization result with said error points removed for source images and reference images, (ii) said processor is further configured to generate a combination of said binarization result with said error points removed for said source images and said reference images in response to an XOR operation.

16. The apparatus according to claim 1, wherein said video frames comprise single-channel images captured by a monocular camera.

17. The apparatus according to claim 1, wherein said convolutional neural network is configured to output (i) a zero for said binarization result when a comparison of said adaptive result to said video frames is greater than or equal to one and (ii) a one for said binarization result when said comparison of said adaptive result to said video frames is less than one.

18. The apparatus according to claim 1, wherein said binarization result with said error points removed generated by said convolutional neural network comprises a preprocessing result of source images and reference images for upcoming operations performed by said processor.

19. The apparatus according to claim 18, wherein (i) said upcoming operations comprise generating said disparity map and said depth map in response to a matching operation and (ii) said preprocessing result of said source images and said reference images comprise an input for said matching operation.

20. The apparatus according to claim 1, wherein said apparatus is configured to add an adaptive offset term using convolution techniques to a local adaptive binarization expression.

* * * * *